US012347951B2

(12) United States Patent
Ho et al.

(10) Patent No.: US 12,347,951 B2
(45) Date of Patent: Jul. 1, 2025

(54) CABLE-END CONNECTOR, BOARD-END CONNECTOR AND ASSEMBLY THEREOF

(71) Applicant: Molex, LLC, Lisle, IL (US)

(72) Inventors: Yi-Tse Ho, New Taipei (TW); Ricardo Alvarez Gonzalez, Lisle, IL (US); Robert Piszczor, LaGrange, IL (US)

(73) Assignee: Molex, LLC, Lisle, IL (US)

( * ) Notice: Subject to any disclaimer, the term of this patent is extended or adjusted under 35 U.S.C. 154(b) by 470 days.

(21) Appl. No.: 17/902,494

(22) Filed: Sep. 2, 2022

(65) Prior Publication Data

US 2023/0076927 A1 Mar. 9, 2023

(30) Foreign Application Priority Data

Sep. 7, 2021 (CN) ........................ 202111042872.0
Jul. 11, 2022 (CN) ........................ 202210811606.8

(51) Int. Cl.
*H01R 12/70* (2011.01)
*H01R 13/518* (2006.01)

(52) U.S. Cl.
CPC ....... *H01R 12/7029* (2013.01); *H01R 13/518* (2013.01)

(58) Field of Classification Search
CPC ................ H01R 12/70; H01R 12/7005; H01R 12/7011; H01R 12/7017; H01R 12/7029; H01R 13/46; H01R 13/514; H01R 13/516; H01R 13/518
USPC .......................................................... 439/567
See application file for complete search history.

(56) References Cited

U.S. PATENT DOCUMENTS 6,776,658 B2 8/2004 Tang
6,890,205 B1 5/2005 Wu
2017/0245386 A1 8/2017 Park
2023/0076927 A1* 3/2023 Ho .................... H01R 12/7088

FOREIGN PATENT DOCUMENTS

CN 101986470 B 5/2015
CN 206602237 U 10/2017
CN 103872484 B 12/2017
CN 207677185 U 7/2018

(Continued)

*Primary Examiner* — Peter G Leigh

(57) ABSTRACT

A cable-end connector, a board-end connector and an assembly thereof are provided. The assembly of the cable-end connector and the board-end connector includes a cable-end connector and a board-end connector. The cable-end connector includes an outer casing, a first contact member, a second contact member, two cables and a first locking structure. The board-end connector is used to mate with the cable-end connector, and the board-end connector includes a circuit board, a third contact member, a fourth contact member and a second locking structure. By that the first contact member and the second contact member are arranged diagonally and the third contact member and the fourth contact member are arranged diagonally, the cable-end connector and the board-end connector can be reduced in width along a lateral direction, and designed spaces respectively for the first locking structure and the second locking structure can be reserved, in turn a space of the cable-end connector and a space of the board-end connector can be used effectively.

20 Claims, 24 Drawing Sheets

(56) References Cited

FOREIGN PATENT DOCUMENTS

| | | | |
|---|---|---|---|
| CN | 209071643 | U | 7/2019 |
| CN | 210272770 | U | 4/2020 |
| CN | 106575829 | B | 11/2020 |
| CN | 212848965 | U | 3/2021 |
| CN | 115776003 | A | 3/2023 |
| TW | M414684 | U | 10/2011 |
| TW | M537731 | U | 3/2017 |
| TW | M600491 | U | 8/2020 |
| TW | I726522 | B | 5/2021 |
| WO | 2015196913 | A1 | 12/2015 |

* cited by examiner

CABLE-END CONNECTOR, BOARD-END CONNECTOR AND ASSEMBLY THEREOF

RELATED APPLICATIONS

This application claims priority to Chinese Patent Applications Serial No. 202111042872.0 filed on Sep. 7, 2021 and 202210811606.8 on filed Jul. 11, 2022, which are incorporated herein by reference in their entireties.

TECHNICAL FIELD

The present disclosure relates to a cable-end connector, and particularly relates to a cable-end connector, a board-end connector and an assembly thereof.

BACKGROUND ART

Chinese invention patent application issuance publication No. CN103872484B discloses an electrical connector assembled component in which a first contact section of a long terminal and a first contact section of a short terminal are respectively inserted into elastic barreled members which are held in the corresponding first receiving terminals of a first attachment connector. If the insertion further progresses, the first contact section of the long terminal and the first contact section of the short terminal move down while elastically increasing diameters of annular neck sections of the respective corresponding elastic barreled members and reach predetermined positions. The respective elastic barreled members, which elastically increase their diameters, elastically contact with outer circumferential surfaces of the first contact sections, and increase elastic contact pressures relative to inner surfaces of housing holes of the first receiving terminals. Thereafter, an intermediate connector is secured onto a first circuit board with screws. For detaching the intermediate connector from the first circuit board, lift the intermediate connector upward after removing the screws. In this case, all the contact sections of the first terminal and the second terminal are arranged in a lateral direction, and a width of the connector in the lateral direction designed based on such an arrangement is limited by a total width of the two contact sections and thus is difficult to reduce.

SUMMARY

Therefore, one of objects of the present disclosure is to provide a cable-end connector, a board-end connector and an assembly thereof which can improve at least one deficiency in prior art.

Accordingly, in some embodiments, a cable-end connector of the present disclosure comprises an outer casing, a first contact member, a second contact member, two cables, a first locking structure and a plane portion. The outer casing has a mating face which is positioned at a bottom of the outer casing, a front end face and a rear end face which face each other, and a first side face and a second side face which face each other, the front end face, the rear end face, the first side face and the second side face are formed by extending from respective side edges of the mating face, the outer casing has a recessed portion which is positioned adjacent to the front end face or the rear end face. The first contact member is provided in the outer casing, the first contact member comprises a first mating portion which is provided in the outer casing and extends toward the mating face and a first connecting portion which is connected to the first mating portion. The second contact member is provided in the outer casing, the second contact member comprises a second mating portion which is provided in the outer casing and extends toward the mating face and a second connecting portion which is connected to the second mating portion. The two cables enter into the outer casing and are electrically connected with the first connecting portion and the second connecting portion respectively. The first locking structure is provided to the outer casing, the first locking structure is at least partially positioned in the recessed portion so that the first locking structure, the first contact member and the second contact member are triangularly arranged. The plane portion is positioned in the mating face and is away from the recessed portion, the plane portion is adjacent to the first mating portion of the first contact member and is adjacent to the second mating portion of the second contact member, the plane portion, the first contact member and the second contact member are triangularly arranged.

In some embodiments, the recessed portion is adjacent to a corner which is between the front end face and the second side face, the first contact member is adjacent to a corner which is between the front end face and the first side face, the second contact member is adjacent to a corner which is between the rear end face and the second side face, and the plane portion is adjacent to a corner which is between the rear end face and the first side face.

In some embodiments, the outer casing is formed by over-molding.

In some embodiments, the outer casing comprises a housing and a cover which are assembled with each other.

In some embodiments, the housing has two through grooves which accommodate the first contact member and the second contact member respectively, each through groove is provided with a stopping edge which is positioned at a bottom of the housing and is adjacent to the mating face and an elastic stopping arm which extends from a top of the housing into the through groove, the stopping edges of the two through grooves are used to stop a bottom edge of the first contact member and a bottom edge of the second contact member respectively, and the elastic stopping arms of the two through grooves are used to stop an upper stopping surface of the first contact member and an upper stopping surface of the second contact member respectively.

In some embodiments, the first mating portion comprises a barrel body and a cage-shaped contact body provided inside the barrel body, and the second mating portion comprises a barrel body and a cage-shaped contact body provided inside the barrel body.

In some embodiments, the cage-shaped contact body of the first mating portion and second connecting portion each have an annular head portion and an elastic contact piece which is formed to extend from the annular head portion.

In some embodiments, the first locking structure has a cantilevered arm which extends downwardly and a first latching unit which is provided to the cantilevered arm.

In some embodiments, the first locking structure has an opening which penetrates in an up-down direction.

In some embodiments, the first locking structure comprises an opening which penetrates in an up-down direction and a screw which rotatively passes through the opening.

In some embodiments, a projection of the first contact member onto the front end face and a projection of the second contact member onto the front end face are partially overlapped with each other.

In some embodiments, a projection of the first contact member onto the first side face and a projection of the second contact member onto the first side face are partially overlapped with each other.

In some embodiments, the two cables enter into the outer casing from the rear end face and are electrically connected with the first connecting portion and the second connecting portion respectively.

In some embodiments, the outer casing further has an upper end face which is spaced apart from the mating face and faces the mating face, and the two cables respectively enter into the outer casing from the upper end face and are electrically connected with the first connecting portion and the second connecting portion respectively.

In some embodiments, the first connecting portion and the second connecting portion each are plate-shaped, and the two cables are electrically connected with a side surface of the first connecting portion and a side surface of the second connecting portion, the side surface of the first connecting portion and the side surface of the second connecting portion are positioned respectively at opposite sides of the first connecting portion and the second connecting portion.

Accordingly, in some embodiments, a board-end connector of the present disclosure comprises a circuit board, a third contact member, a fourth contact member and a second locking structure. The circuit board has a rectangular region, a first corner and a second corner which are positioned diagonally within the rectangular region and face each other, and a third corner which is positioned within the rectangular region. The third contact member is provided to the first corner and comprises a third connecting portion which is electrically connected to the circuit board and a third mating portion which is formed by extending upwardly from the third connecting portion. The fourth contact member is provided to the second corner and is diagonally arranged with the third contact member, and comprises a fourth connecting portion which is electrically connected to the circuit board and a fourth mating portion formed by extending upwardly from the fourth connecting portion. The second locking structure is provided to the third corner.

In some embodiments, the second locking structure comprises a base portion which extends upwardly and a second latching unit which is provided to the base portion.

In some embodiments, the second locking structure comprises a base portion which extends upwardly and a screw hole which is provided to the base portion.

In some embodiments, the board-end connector further comprises a seat body which is rectangular in shape and provided to the circuit board, the seat body has two through-holes which penetrate in an up-down direction and are formed at positions respectively corresponding to the first corner and the second corner of the circuit board, the third mating portion and the fourth mating portion pass upwardly through the two through-holes respectively, the second locking structure is formed to be constructed integrally from the seat body, and the seat body and the circuit board are locked with each other by at least one screw.

In some embodiments, the third contact member further has interfering ribs which are used to interfere with an inner wall surface of the corresponding through-hole, and the fourth contact member further has interfering ribs which are used to interfere with an inner wall surface of the corresponding through-hole.

In some embodiments, the third contact member further has raising protrusions which are used to be stopped by a top surface of the circuit board to raise the third contact member so as to form a space for filling a solder, and the fourth contact member further has raising protrusions which are used to be stopped by the top surface of the circuit board to raise the fourth contact member so as to form a space for filling a solder.

In some embodiments, the third mating portion and the fourth mating portion are cylindrical in shape.

Accordingly, in some embodiments, an assembly of a cable-end connector and a board-end connector of the present disclosure comprises a cable-end connector and a board-end connector. The cable-end connector comprises an outer casing, a first contact member, a second contact member, two cables, a first locking structure and a plane portion. The outer casing has a mating face which is positioned at a bottom of the outer casing, a front end face and a rear end face which face each other, and a first side face and a second side face which face each other, the front end face, the rear end face, the first side face and the second side face are formed by extending from respective side edges of the mating face, the outer casing has a recessed portion which is positioned adjacent to the front end face or the rear end face. The first contact member is provided in the outer casing, the first contact member comprises a first mating portion which is provided in the outer casing and extends toward the mating face and a first connecting portion which is connected to the first mating portion. The second contact member is provided in the outer casing, the second contact member comprises a second mating portion which is provided in the outer casing and extends toward the mating face and a second connecting portion which is connected to the second mating portion. The two cables enter into the outer casing and are electrically connected with the first connecting portion and the second connecting portion respectively. The first locking structure is provided to the outer casing, the first locking structure is at least partially positioned in the recessed portion so that the first locking structure, the first contact member and the second contact member are triangularly arranged. The plane portion is positioned in the mating face and is away from the recessed portion, the plane portion is adjacent to the first mating portion of the first contact member and is adjacent to the second mating portion of the second contact member, the plane portion, the first contact member and the second contact member are triangularly arranged. The board-end connector is used to mate with the cable-end connector, and the board-end connector comprises a circuit board, a third contact member, a fourth contact member and a second locking structure. The third contact member comprises a third connecting portion which is electrically connected to the circuit board and a third mating portion which is formed by extending upwardly from the third connecting portion and is used to mate with the first mating portion. The fourth contact member comprises a fourth connecting portion which is electrically connected to the circuit board and a fourth mating portion which is formed by extending upwardly from the fourth connecting portion and is used to mate with the second mating portion. The second locking structure is provided to the circuit board, the second locking structure is used to lock with the first locking structure.

In some embodiments, the recessed portion is adjacent to a corner which is between the front end face and the second side face, the first contact member is adjacent to a corner which is between the front end face and the first side face, the second contact member is adjacent to a corner which is between the rear end face and the second side face, and the plane portion is adjacent to a corner which is between the rear end face and the first side face.

In some embodiments, the outer casing is formed by over-molding.

In some embodiments, the outer casing comprises a housing and a cover which are assembled with each other.

In some embodiments, the housing has two through grooves which accommodate the first contact member and the second contact member respectively, each through groove is provided with a stopping edge which is positioned at a bottom of the housing and is adjacent to the mating face and an elastic stopping arm which extends from a top of the housing into the through groove, the stopping edges of the two through grooves are used to stop a bottom edge of the first contact member and a bottom edge of the second contact member respectively, and the elastic stopping arms of the two through grooves are used to stop an upper stopping surface of the first contact member and an upper stopping surface of the second contact member respectively.

In some embodiments, the first mating portion comprises a barrel body and a cage-shaped contact body provided inside the barrel body, and the second mating portion comprises a barrel body and a cage-shaped contact body provided inside the barrel body; and the third mating portion and the fourth mating portion are cylindrical in shape and are used to electrically connected with the cage-shaped contact body of the first mating portion and the cage-shaped contact body of the second mating portion respectively.

In some embodiments, the cage-shaped contact body of the first mating portion and second connecting portion each have an annular head portion and an elastic contact piece which is formed to extend from the annular head portion.

In some embodiments, the first locking structure has a cantilevered arm which extends downwardly and a first latching unit which is provided to the cantilevered arm; and the second locking structure comprises a base portion which extends upwardly and a second latching unit which is provided to the base portion and is used to latch with the first latching unit.

In some embodiments, the second locking structure comprises a base portion which extends upwardly and a screw hole which is provided to the base portion; and the first locking structure comprises an opening which penetrates in an up-down direction and a screw which rotatively passes through the opening and is used to screw with the screw hole.

In some embodiments, the board end connector further comprises a seat body which is provided to the circuit board, the seat body has two through-holes which penetrate in an up-down direction, the third mating portion and the fourth mating portion pass upwardly through the two through-holes respectively, and the second locking structure is formed to be constructed integrally from the seat body.

In some embodiments, the third contact member further has interfering ribs which are used to interfere with an inner wall surface of the corresponding through-hole, and the fourth contact member further has interfering ribs which are used to interfere with an inner wall surface of the corresponding through-hole.

In some embodiments, the third contact member further has raising protrusions which are used to be stopped by a top surface of the circuit board to raise the third contact member so as to form a space for filling a solder, and the fourth contact member further has raising protrusions which are used to be stopped by the top surface of the circuit board to raise the fourth contact member so as to form a space for filling a solder.

In some embodiments, a projection of the first contact member onto the front end face and a projection of the second contact member onto the front end face are partially overlapped with each other.

In some embodiments, a projection of the first contact member onto the first side face and a projection of the second contact member onto the first side face are partially overlapped with each other.

In some embodiments, the two cables enter into the outer casing from the rear end face and are electrically connected with the first connecting portion and the second connecting portion respectively.

In some embodiments, the first connecting portion and the second connecting portion each are plate-shaped, and the two cables are electrically connected with a side surface of the first connecting portion and a side surface of the second connecting portion, the side surface of the first connecting portion and the side surface of the second connecting portion are positioned respectively at opposite sides of the first connecting portion and the second connecting portion.

In some embodiments, the outer casing further has an upper end face which is spaced apart from the mating face and faces the mating face, and the two cables respectively enter into the outer casing from the upper end face and are electrically connected with the first connecting portion and the second connecting portion respectively.

In some embodiments, the cable-end connector further has an abutting rib which is provided in the recessed portion of the outer casing, the abutting rib is capable of allowing the first locking structure to abut thereagainst, and the second locking structure of the board-end connector comprises an avoiding groove which corresponds to the abutting rib, the avoiding groove is used to avoid the abutting rib when the first locking structure and the second locking structure are locked with each other.

In the present disclosure, by that the first contact member and the second contact member are arranged diagonally and the third contact member and the fourth contact member are arranged diagonally, the cable-end connector and the board-end connector can be reduced in width along a lateral direction, and designed spaces respectively for the first locking structure and the second locking structure can be reserved, in turn a space of the cable-end connector and a space of the board-end connector can be used effectively, meanwhile, the first locking structure and the second locking structure can be designed larger in dimension so as to increase structural strengths thereof.

BRIEF DESCRIPTION OF DRAWINGS

Other features and effects of the present disclosure will be apparent in embodiments referring to the accompanying figures, in which.

DETAILED DESCRIPTION OF THE PREFERRED EMBODIMENTS

Figure 1:
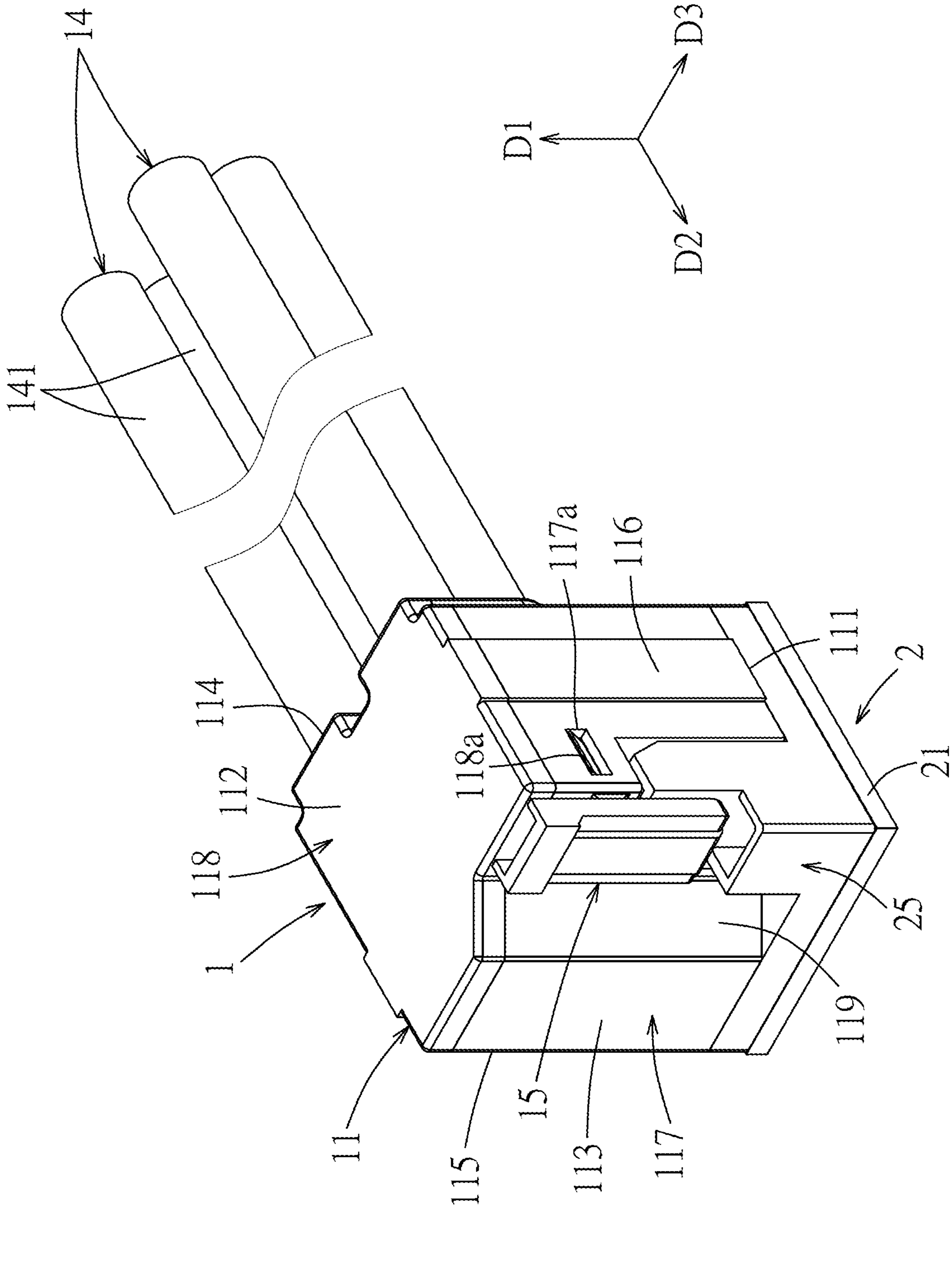
FIG. 1 is a perspective view of a first embodiment of an assembly of a cable-end connector and a board-end connector of the present disclosure.
Figure 2:
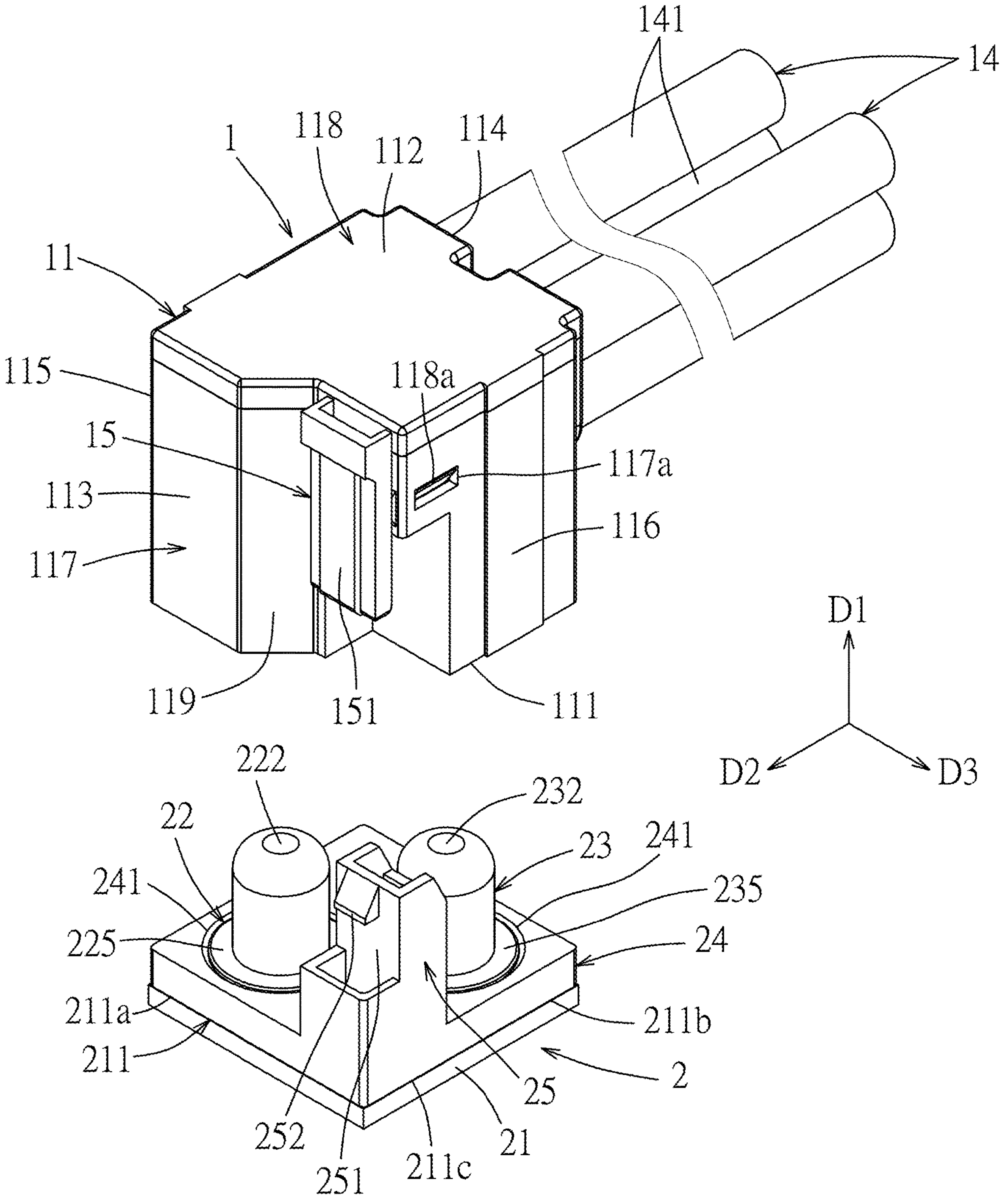
FIG. 2 is a perspective exploded view of the first embodiment.
Figure 3:
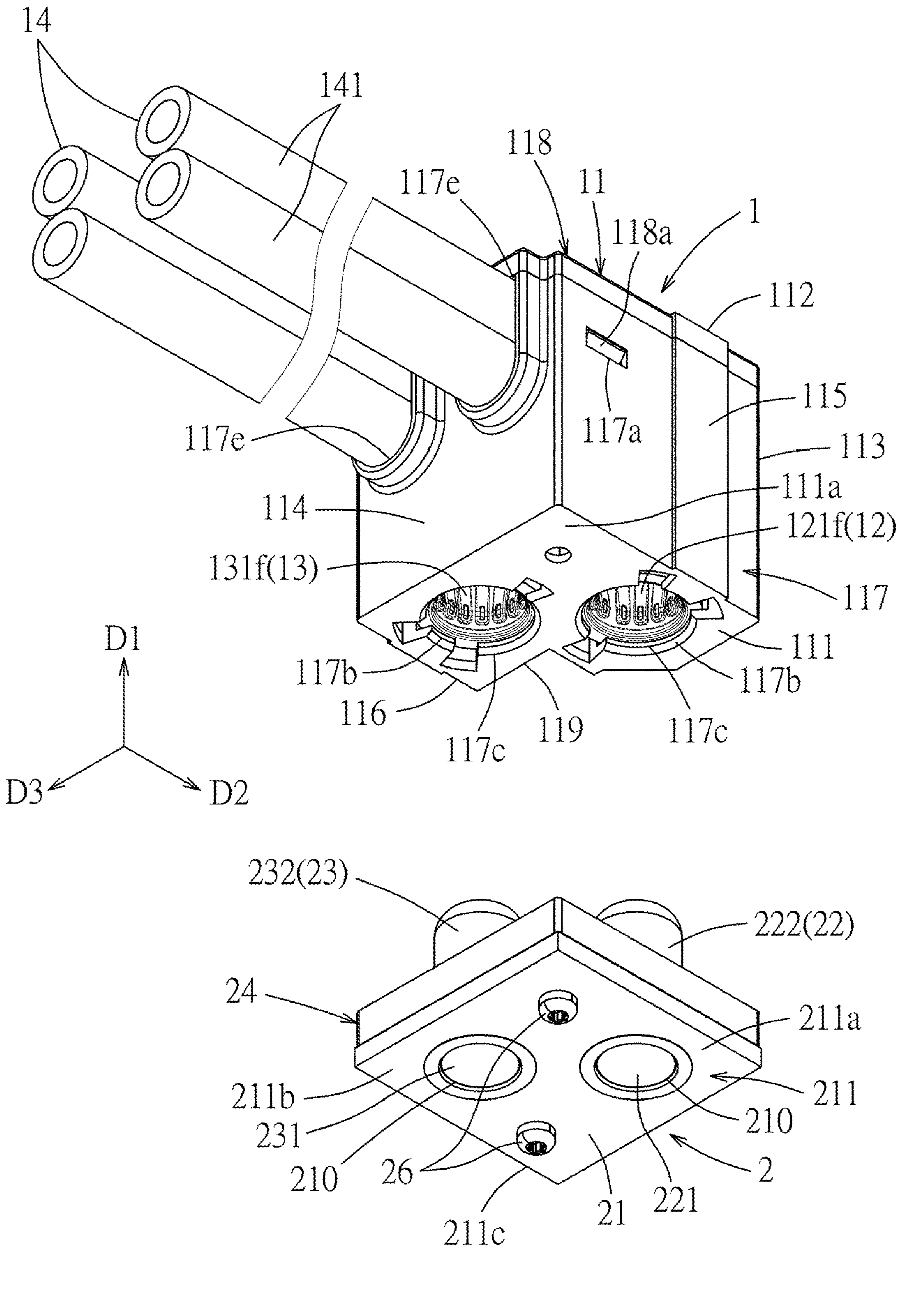
FIG. 3 is a perspective exploded view of the first embodiment of FIG. 2 viewed from another angle.
Figure 4:
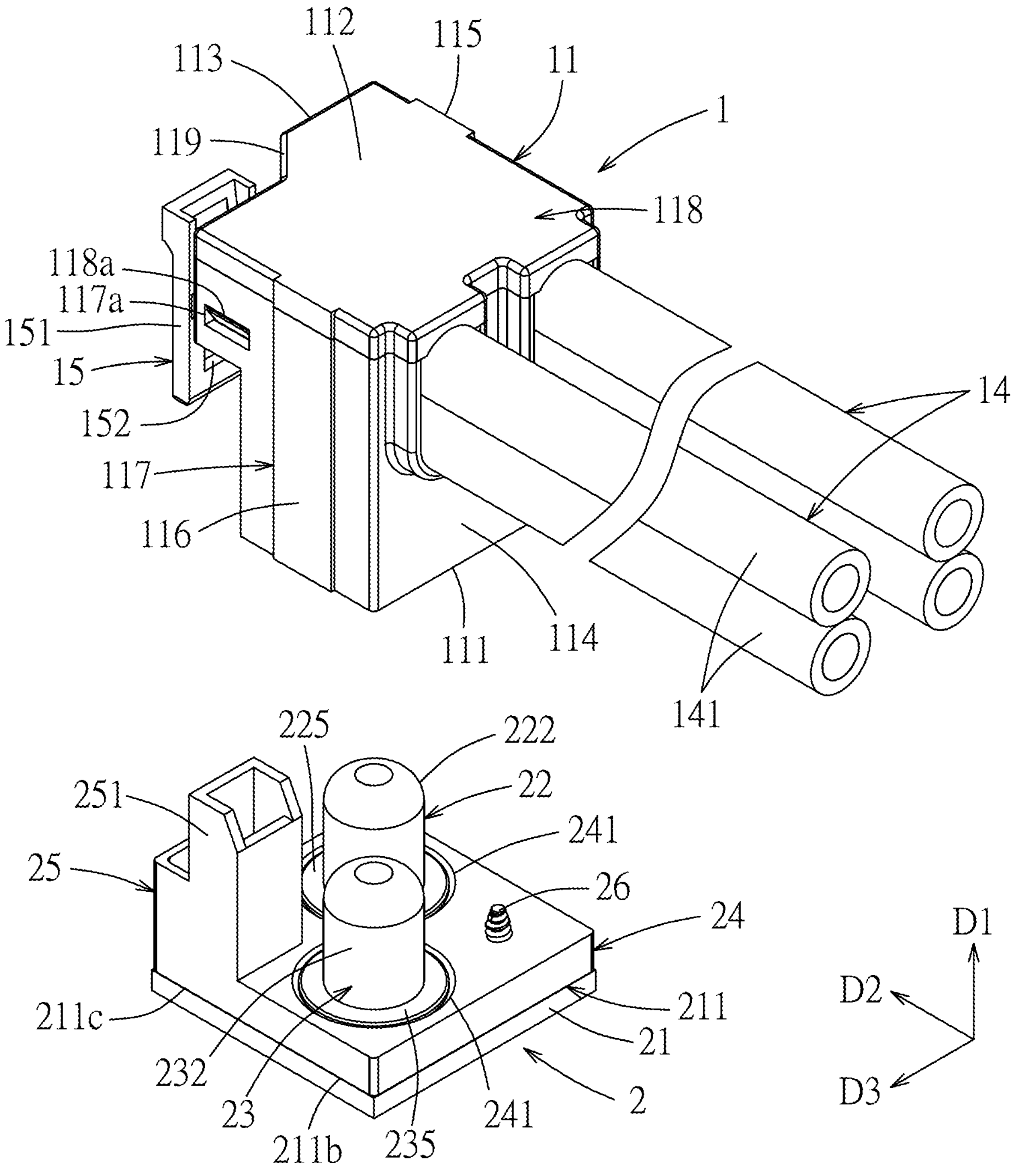
FIG. 4 is a perspective exploded view of the first embodiment of FIG. 2 viewed from another angle.
Figure 5:
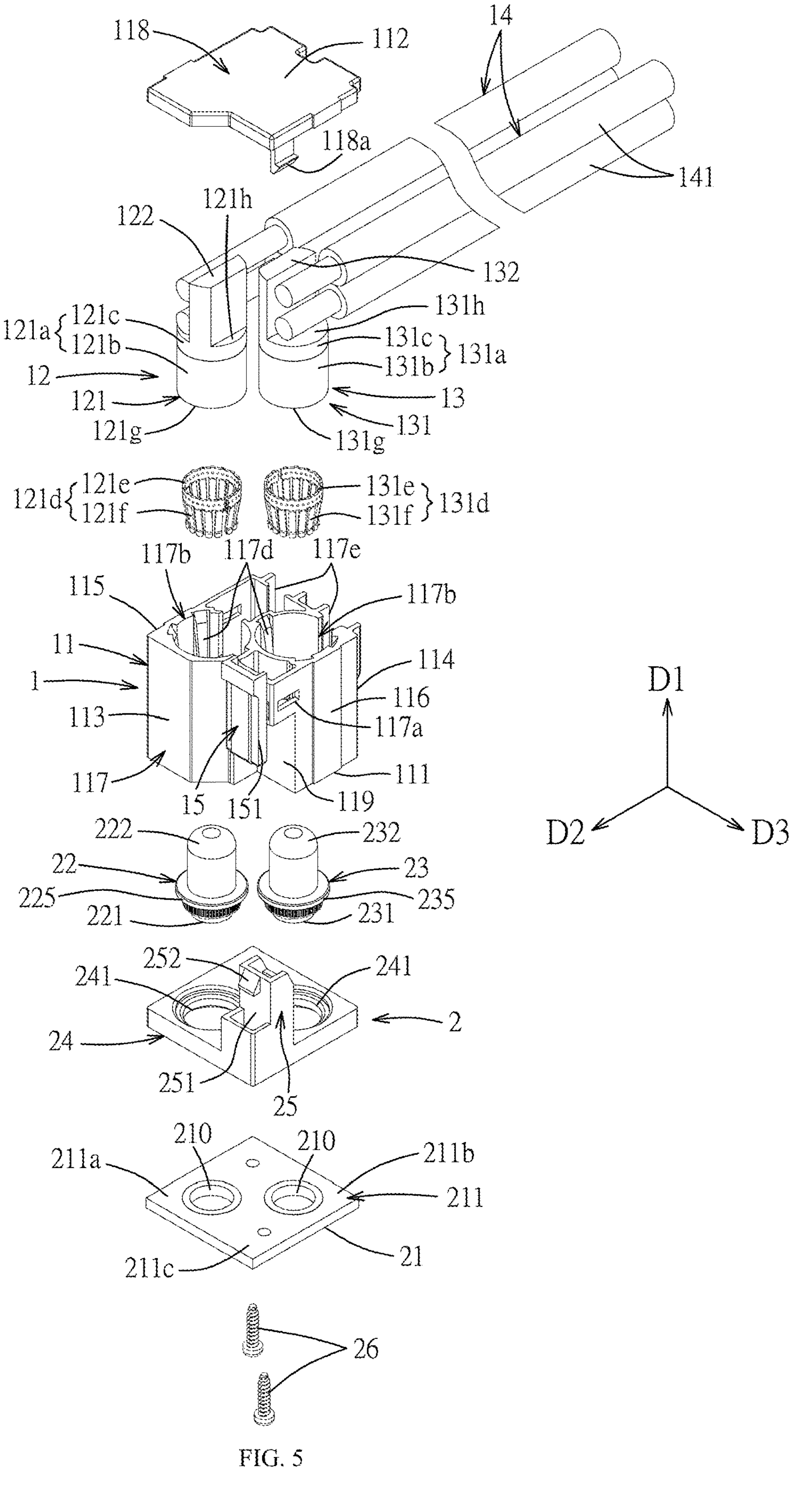
FIG. 5 is a further perspective exploded view of the first embodiment.

Before the present disclosure is described in detail, it is noted that similar elements are represented by the same reference numerals in the following description.

Referring to FIG. 1 to FIG. 4, a first embodiment of an assembly of a cable-end connector 1 and a board-end connector 2 includes a cable-end connector 1 and a board-end connector 2.

Referring to FIG. 2 and FIG. 4 to FIG. 6, the cable-end connector 1 includes an outer casing 11, a first contact member 12, a second contact member 13, two cables 14 and a first locking structure 15.

The outer casing 11 is made of an insulating material and has a mating face 111 and an upper end face 112 which are respectively positioned at a bottom and a top of the outer casing 11, are spaced apart from each other, and face each other along an up-down direction D1 (a direction to which an arrow points is up, and an opposite direction is down), a front end face 113 and a rear end face 114 which face each other along a front-rear direction D2 (a direction to which an arrow points is front, and an opposite direction is rear), and a first side face 115 and a second side face 116 which face each other along a left-right direction D3 (a direction to which an arrow points is right, and an opposite direction is right). The front end face 113, the rear end face 114, the first side face 115 and the second side face 116 are formed by extending from respective side edges of the mating face 111 along the up-down direction D1. In the first embodiment, the outer casing 11 includes a housing 117 and a cover 118 which are assembled with each other along the up-down direction D1. For example, the housing 117 has two latching holes 117*a*, the cover 118 has two latching elastic arms 118*a* which correspondingly latch with the two latching holes 117*a*.

Referring to FIG. 3 and FIG. 5 to FIG. 8, the first contact member 12 extends in the up-and-down direction D1, is provided in the outer casing 11 and is adjacent to a corner which is between the front end face 113 and the first side face 115. The first contact member 12 includes a first mating portion 121 which is provided in the outer casing 11 and extends toward the mating face 111 and a first connecting portion 122 which is provided in the outer casing 11 and is connected to the first connecting portion 121. The second contact member 13 extends in the up-down direction D1, is provided in the outer casing 11, is adjacent to a corner which is between the rear end face 114 and the second side face 116, and is arranged diagonally with the first contact member 12. The second contact member 13 includes a second mating portion 131 which is provided in the outer casing 11 and extends toward the mating face 111 and a second connecting portion 132 which is provided in the outer casing 11 and is connected to the second mating portion 131. In the first embodiment, a projection of the first contact member 12 onto the front end face 113 and a projection of the second contact member 13 onto the front end face 113 are partially overlapped with each other, and a projection of the first contact member 12 onto the first side face 115 and a projection of the second contact member 13 onto the first side face 115 also are partially overlapped with each other.

Specifically, the first mating portion 121 includes a barrel body 121*a* and a cage-shaped contact body 121*d* provided inside the barrel body 121*a*. The barrel body 121*a* includes a tube-shaped member 121*b* which is positioned in below and a lid-shaped member 121*c* which is provided to a top of the tube-shaped member 121*b* and cooperates with the tube-shaped member 121*b* to clip the cage-shaped contact body 121*d*. The cage-shaped contact body 121*d* has an annular head portion 121*e* which is clipped together by the tube-shaped member 121*b* and the lid-shaped member 121*c* and a plurality of elastic contact pieces 121*f* which are formed to extend downwardly from the annular head portion 121*e* toward the mating face 111. In addition, the first connecting portion 122 is plate-shaped and is formed to integrally extend upwardly from a top surface of the lid-shaped member 121*c* of the first mating portion 121. The second mating portion 131 includes a barrel body 131*a* and a cage-shaped contact body 131*d* provided inside the barrel body 131*a*. The barrel body 131*a* includes a tube-shaped member 131*b* which is positioned in below and a lid-shaped member 131*c* which is provided to a top of the tube-shaped member 131*b* and cooperates with the tube-shaped member 131*b* to clip the cage contact 131*d*. The cage-shaped contact body 131*d* has an annular head portion 131*e* which is clipped together by the tube-shaped member 131*b* and the lid-shaped member 131*c* and a plurality of elastic contact pieces 131*f* which are formed to extend downwardly from the annular head portion 131*e* toward the mating face 111. In addition, the second connecting portion 132 is plate-shaped and is formed to integrally extend upwardly from a top surface of the lid-shaped member 131*c* of the second mating portion 131.

The housing 117 has two through grooves 117*b* which are formed in the up-down direction D1, extend to the mating face 111 and accommodate the first contact member 12 and the second contact member 13 respectively. Each through groove 117*b* is provided with a stopping edge 117*c* which is positioned at a bottom of the housing 117 and is adjacent to the mating face 111 and an elastic stopping arm 117*d* which extends from a top of the housing 117 into the through groove 117*b*. The stopping edges 117*c* of the two through grooves 117*b* are used to stop a bottom edge 121*g* of the barrel body 121*a* of the first contact member 12 and a bottom edge 131*g* of the barrel body 131*a* of the second contact member 13 respectively. The elastic stopping arms 117*d* of the two through grooves 117*b* are used to stop an upper stopping surface 121*h* of the barrel body 121*a* of the first contact member 12 and an upper stopping surface 131*h* of the barrel body 131*a* of the second contact member 13 respectively.

The two cables 14 respectively enter into the two through grooves 117*b* of the outer casing 11 via two cable passing holes 117*e* of the housing 117 of the outer casing 11 which are positioned on the rear end face 114, and are electrically connected with the first connecting portion 122 and the second connecting portion 132 respectively. Specifically, the two cables 14 are electrically connected respectively to a side surface of the first connecting portion 122 which is plate shaped and a side surface of the second connecting portion 132 which is plate shaped, the side surface of the first connecting portion 122 and the side surface of the second connecting portion 132 are positioned respectively at opposite sides of the first connecting portion 122 and the second connecting portion 132. It is noted that, in the first embodiment, each cable 14 is composed of two wires 141, but the wire 141 of each cable 14 can be adjusted in number according to the needs, and the cable 14 may be composed of only one wire 141 which is thicker, or the cable 14 may be composed of three or more wires 141 which are thinner so as to make the cable 14 more flexible as a whole, which thus is not limited to the first embodiment.

The first locking structure 15 is provided to the outer casing 11 and is positioned adjacent to a corner which is between the front end face 113 and the second side face 116. The outer casing 11 has a recessed portion 119 which is positioned adjacent to the corner between the front end face 113 and the second side face 116, the first locking structure 15 is formed to be constructed integrally from the outer casing 11 and is positioned in the recessed portion 119, so that the first locking structure 15, the first contact member 12 and the second contact member 13 are triangularly arranged. It is noted that, in other embodiments, the first locking structure 15 may also be only at least partially positioned in the recessed portion 119. In addition, the cable-end connector 1 is constructed with a plane portion 111*a* which is positioned in the mating face 111 and is adjacent to a corner between the rear end face 114 and the first side face 115. The plane portion 111*a* is positioned at a side of the mating face 111 opposite to the recessed portion 119 and is away from the recessed portion 119, the plane portion 111*a* is adjacent to the first mating portion 121 of the first contact member 12 and adjacent to the second mating portion 131 of the second contact member 13, and the plane portion 111*a*, the first contact member 12 and the second contact member 13 are also triangularly arranged. The plane portion 111*a* can abut against the board-end connector 2 so that the cable-end connector 1 and the board-end connector 2 are more stable relative to each other in position and are not prone to shake when the cable-end connector 1 and the board-end connector 2 are mated with each other.

Referring to FIG. 2, FIG. 4 to FIG. 6 and FIG. 9, the board-end connector 2 is used to mate with the cable-end connector 1 along the up-down direction D1, and the board-end connector 2 includes a circuit board 21, a third contact member 22, a fourth contact member 23, a seat body 24 and a second locking structure 25.

The circuit board 21 has a rectangular region 211 which faces upwardly, a first corner 211*a* and a second corner 211*b* which are positioned diagonally within the rectangular region 211 and face each other, and a third corner 211*c* which is positioned within the rectangular region 211. It is noted that, although in the first embodiment, the circuit board 21 is rectangular in shape and the circuit board 21 is entirely positioned within the rectangular region 211, in other embodiments, the circuit board 21 also may be in other shapes and the rectangular region 211 may be only a part of the circuit board 21.

The third contact member 22 extends along the up-down direction D1 and is provided to the first corner 211*a*. The third contact member 22 includes a third connecting portion 221 which is electrically connected to the circuit board 21 and a third mating portion 222 which is formed by extending upwardly from the third connecting portion 221 and is used to mate with the first mating portion 121. The fourth contact member 23 extends along the up-down direction D1 and is provided to the second corner 211*b* so that the fourth contact member 23 is arranged diagonally with the third contact member 22. The fourth contact member 23 includes a fourth connecting portion 231 which is electrically connected to the circuit board 21 and a fourth mating portion 232 which is formed by extending upwardly from the fourth connecting portion 231 and is used to mate with the second mating portion 131. Specifically, the third mating portion 222 and the fourth mating portion 232 are cylindrical in shape and are respectively used to insert from the mating face 111 into the two through grooves 117*b* of the outer casing 11 of the cable-end connector 1, so as to electrically connect with the plurality of elastic contact pieces 121*f* of the cage-shaped contact body 121*d* of the first mating portion 121 and the plurality of elastic contact piece 131*f* of the cage-shaped contact body 131*d* of the second mating portion 131 respectively.

Figure 6:
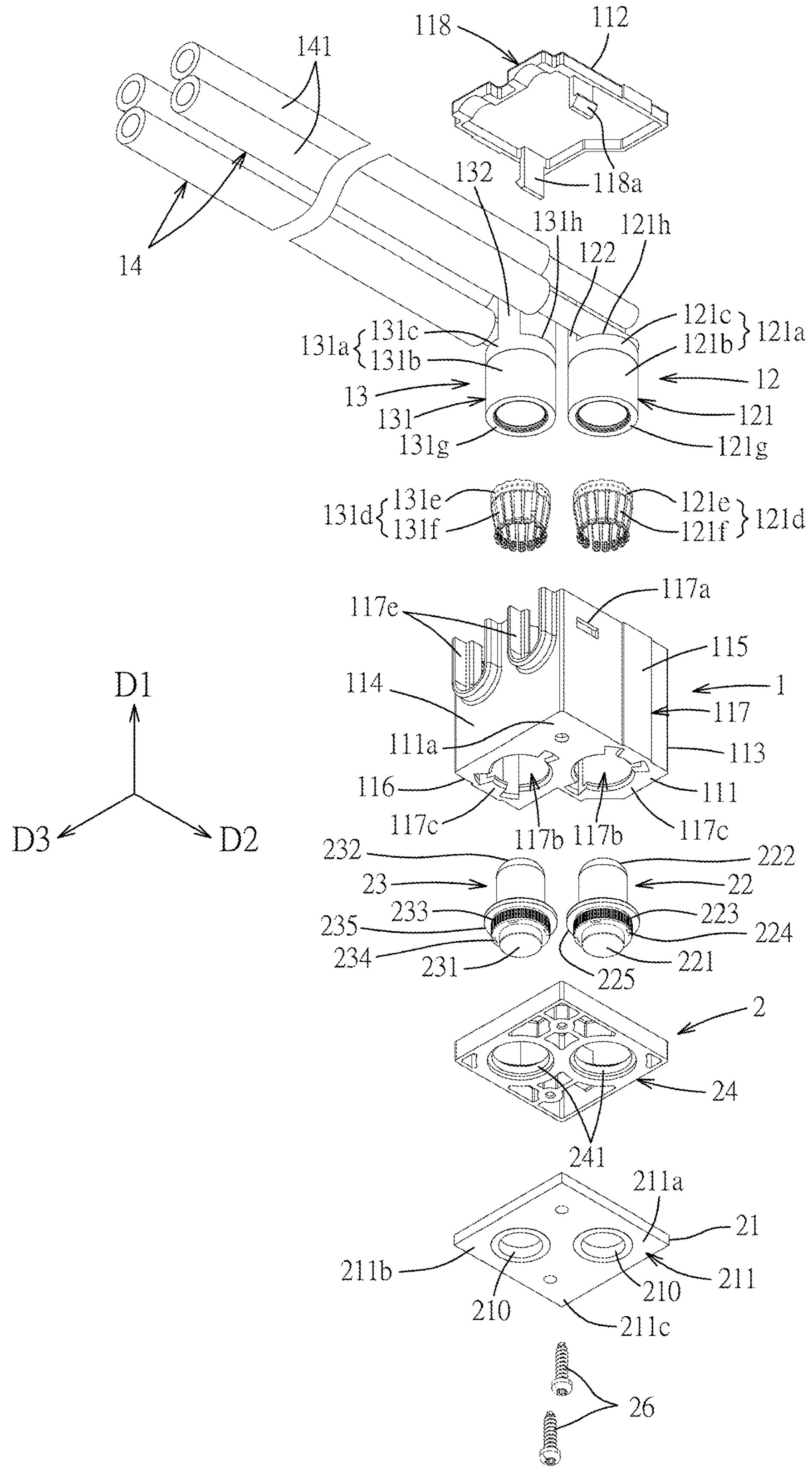
FIG. 6 is a perspective exploded view of the first embodiment of FIG. 5 viewed from another angle.
Figure 7:
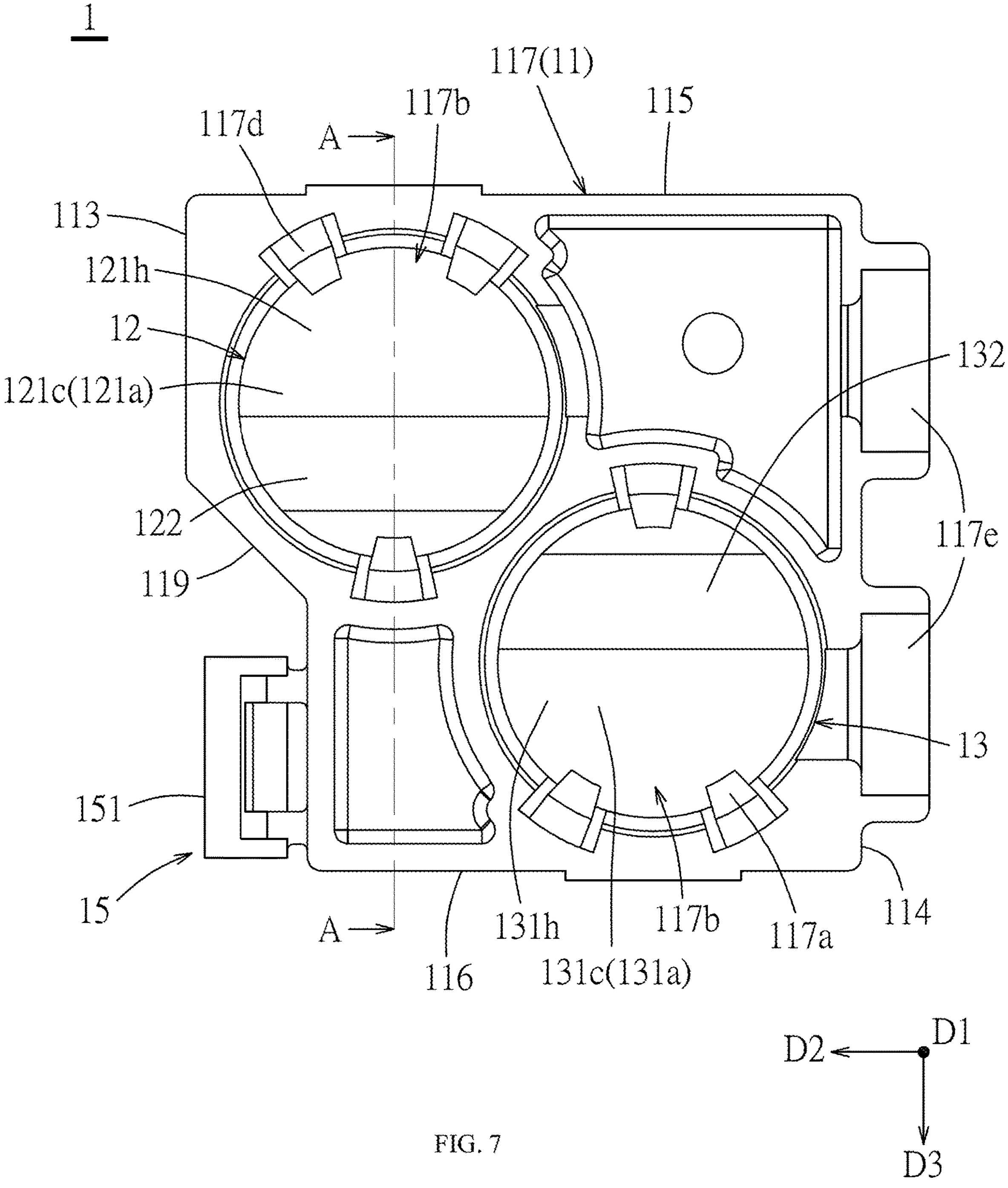
FIG. 7 is a top view of the cable-end connector of the first embodiment with a cable of the cable-end connector and a cover of an outer casing omitted.
Figure 8:
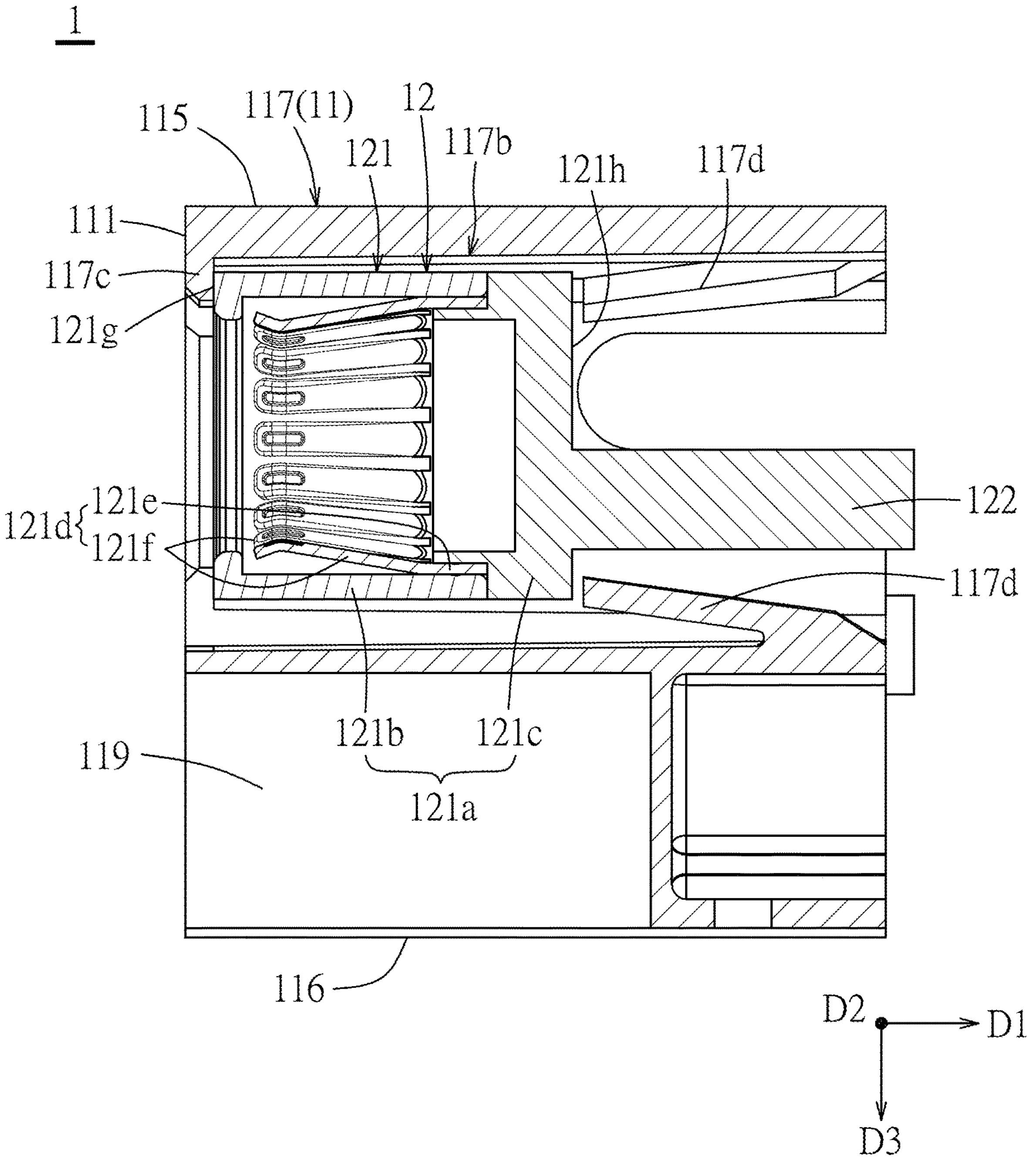
FIG. 8 is a cross-sectional view taken along a line A-A of FIG. 7.
Figure 9:
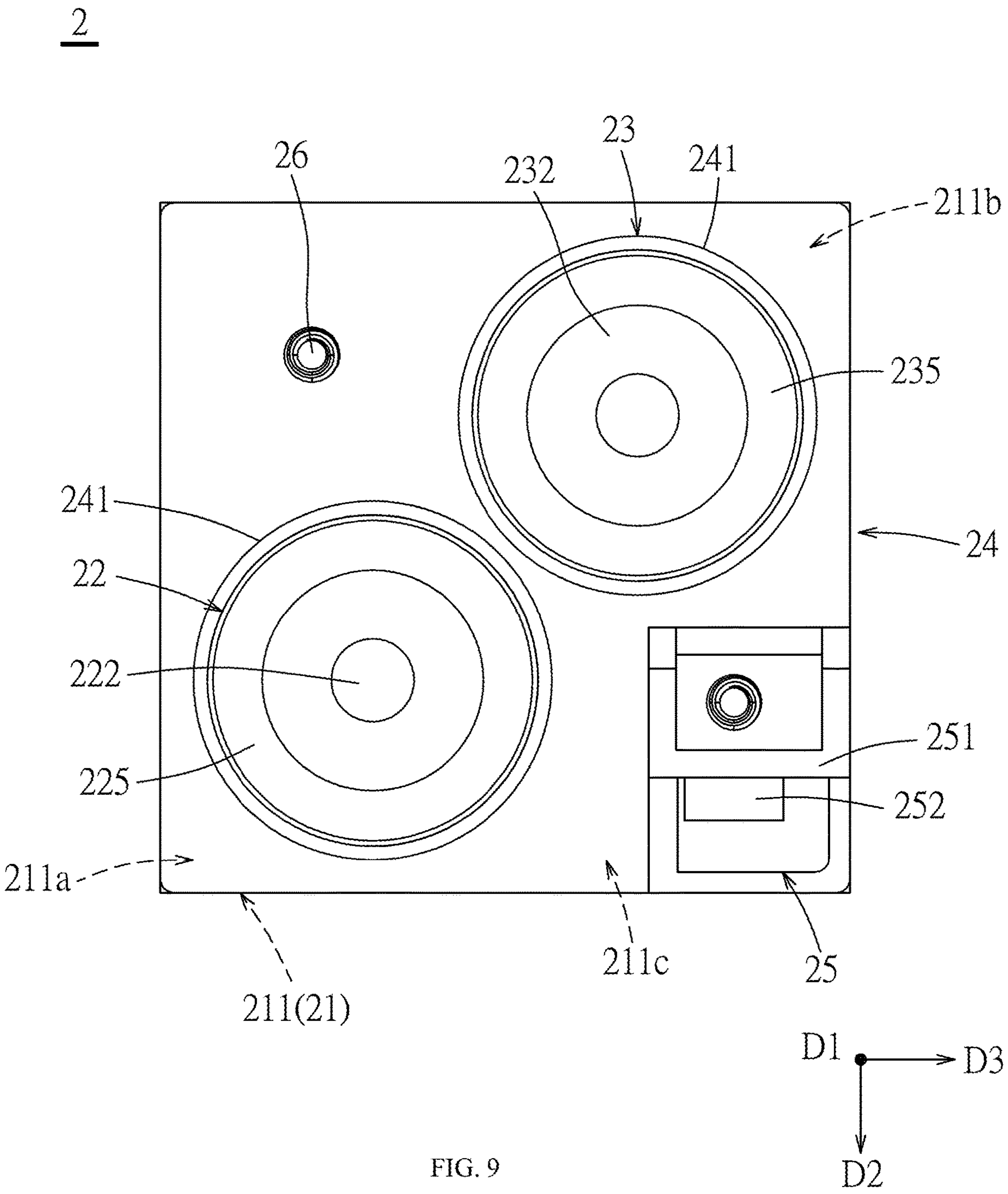
FIG. 9 is a top view of the board-end connector of the first embodiment.
Figure 10:
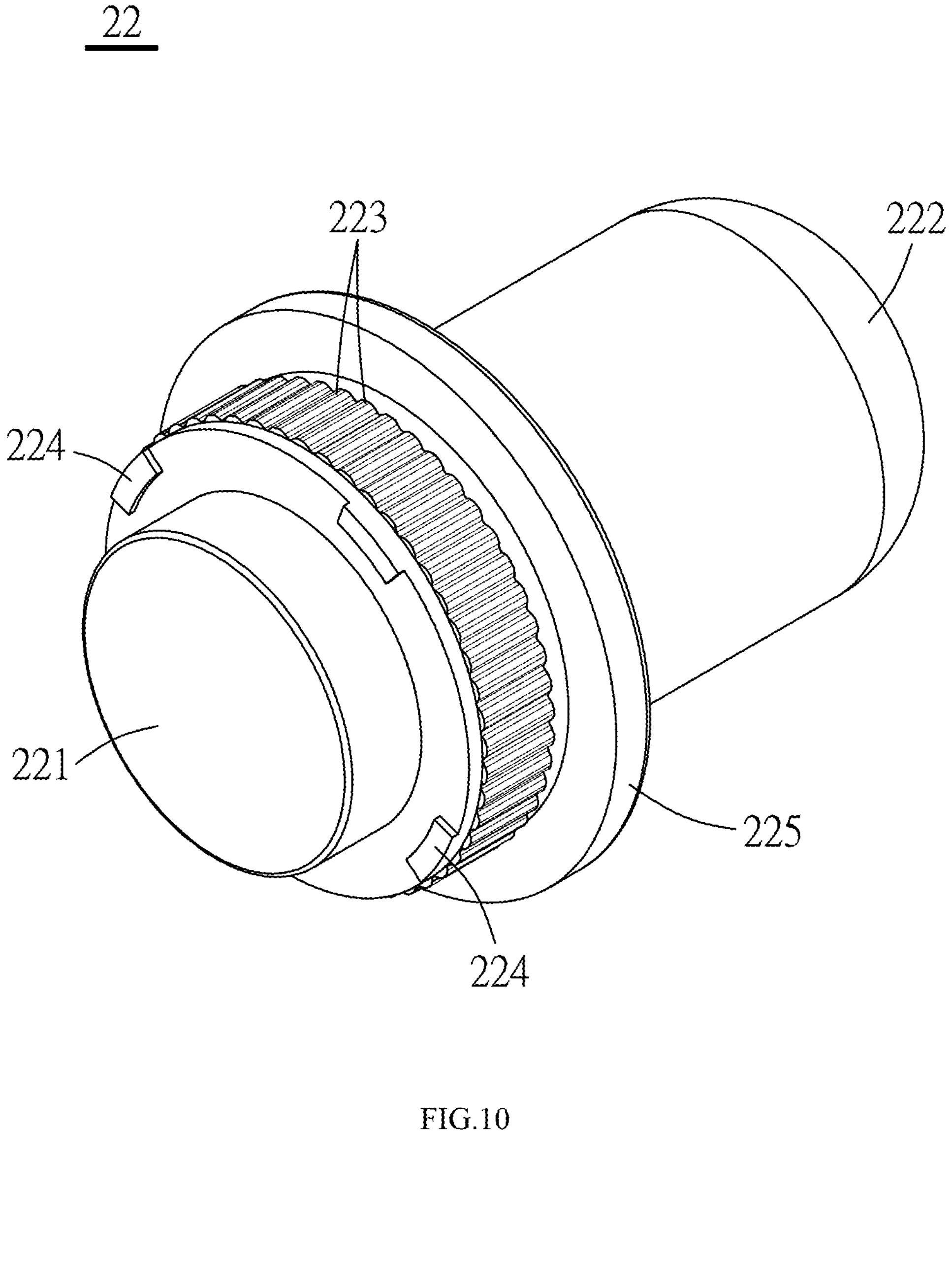
FIG. 10 is a perspective view of a third contact member of the board-end connector of the first embodiment.
Figure 11:
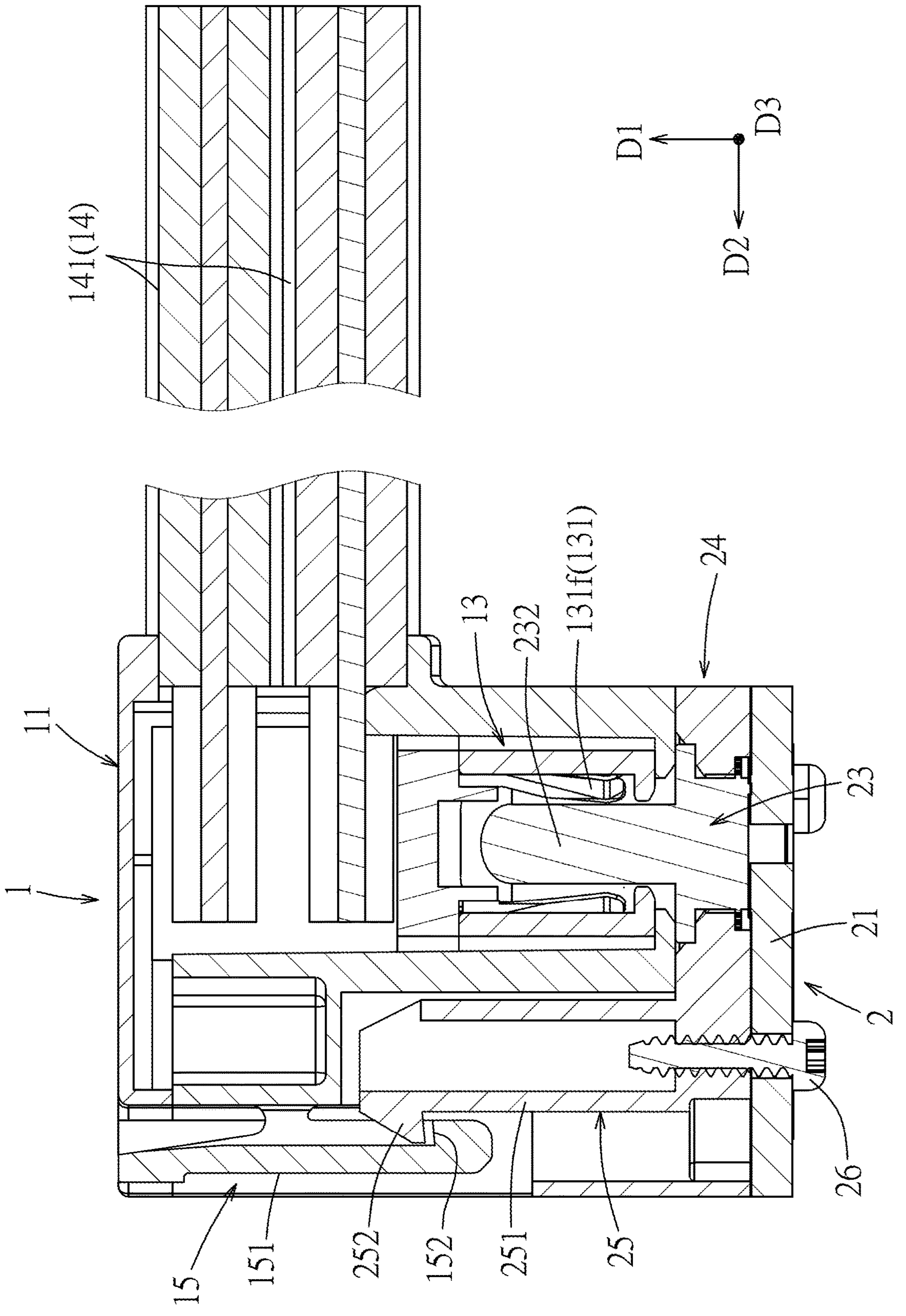
FIG. 11 is a cross-sectional view of the first embodiment.

The seat body 24 is rectangular in shape and is provided on the rectangular region 211 of the circuit board 21. The seat body 24 has two through-holes 241 which penetrate in the up-down direction D1 and are formed at positions respectively corresponding to the first corner 211*a* and the second corner 211*b* of the circuit board 21, the third mating portion 222 and the fourth mating portion 232 pass upwardly through the two through-holes 241 respectively. Specifically, the seat body 24 and the circuit board 21 are locked with each other by means of two locking screws 26. Referring to FIG. 6 and FIG. 10, in the present embodiment, the third connecting portion 221 and the fourth connecting portion 231 are soldering pins which pass through soldering holes 210 of the circuit board 21 respectively and are soldered to the soldering holes 210 of the circuit board 21 respectively. The third contact member 22 and the fourth contact member 23 have a stopping portion 225 and a stopping portion 235 which are respectively to be stopped to a top surface of the seat body 24. In addition, it is noted that, in the first embodiment, the third contact member 22 further has a plurality of interfering ribs 223 which are adjacent to the third connecting portion 221 and are used to interfere with an inner wall surface of the corresponding through-hole 241 and a plurality of raising protrusions 224 which are adjacent to the third connecting portion 221 and are used to be stopped by a top surface of the circuit board 21 to raise the third contact member 22 so as to form a space for filling a solder; the fourth contact member 23 further has a plurality of interfering ribs 233 which are adjacent to the fourth connecting portion 231 and interfere with an inner wall surface of the corresponding through-hole 241 and a plurality of raising protrusions 234 which are adjacent to the fourth connecting portion 231 and are used to be stopped by the top surface of the circuit board 21 to raise the fourth contact member 23 so as to form a space for filling a solder. It is noted that, the raising protrusion 224 and the raising protrusion 234 function to raise the third contact member 22 and the fourth contact member 23 respectively so as to form the spaces for filling solders and increase the soldering strength, but in other embodiments, the raising protrusion 224 and the raising protrusion 234 may be eliminated.

Referring to FIG. 2, FIG. 4 to FIG. 6 and FIG. 11, the second locking structure 25 is provided at the third corner 211*c* and extends upwardly. In the first embodiment, the second locking structure 25 is formed to be constructed integrally from the seat body 24. The second locking structure 25 is used to lock with the first locking structure 15. The second locking structure 25 has a cantilevered arm 151 which extends downwardly and a first latching unit 152 which is provided at a bottom of the cantilevered arm 151; the second locking structure 25 includes a base portion 251 which extends upwardly from the seat body 24 and a second latching unit 252 which is provided to a top of the base portion 251 and is used to latch with the first latching unit 152. The first latching unit 152 may, for example, be a recess, and the second latching unit 252 may, for example, be a protrusion which may cooperate with the recess, and vice versa, which thus is not limited to the first embodiment.

For the cable-end connector 1 and the board-end connector 2 as a whole, by that the first contact member 12 and the second contact member 13 are arranged diagonally and the third contact member 22 and the fourth contact member 23 are arranged diagonally, the cable-end connector 1 and the board-end connector 2 can be reduced in width along a lateral direction (the front-rear direction D2 and the left-right direction D3), and designed spaces respectively for the first locking structure 15 and the second locking structure 25 can be reserved, in turn a space of the cable-end connector 1 and a space of the board-end connector 2 can be used effectively, meanwhile, the first locking structure 15 and the second locking structure 25 can be designed larger in dimension so as to increase structural strengths thereof.

Figure 12:
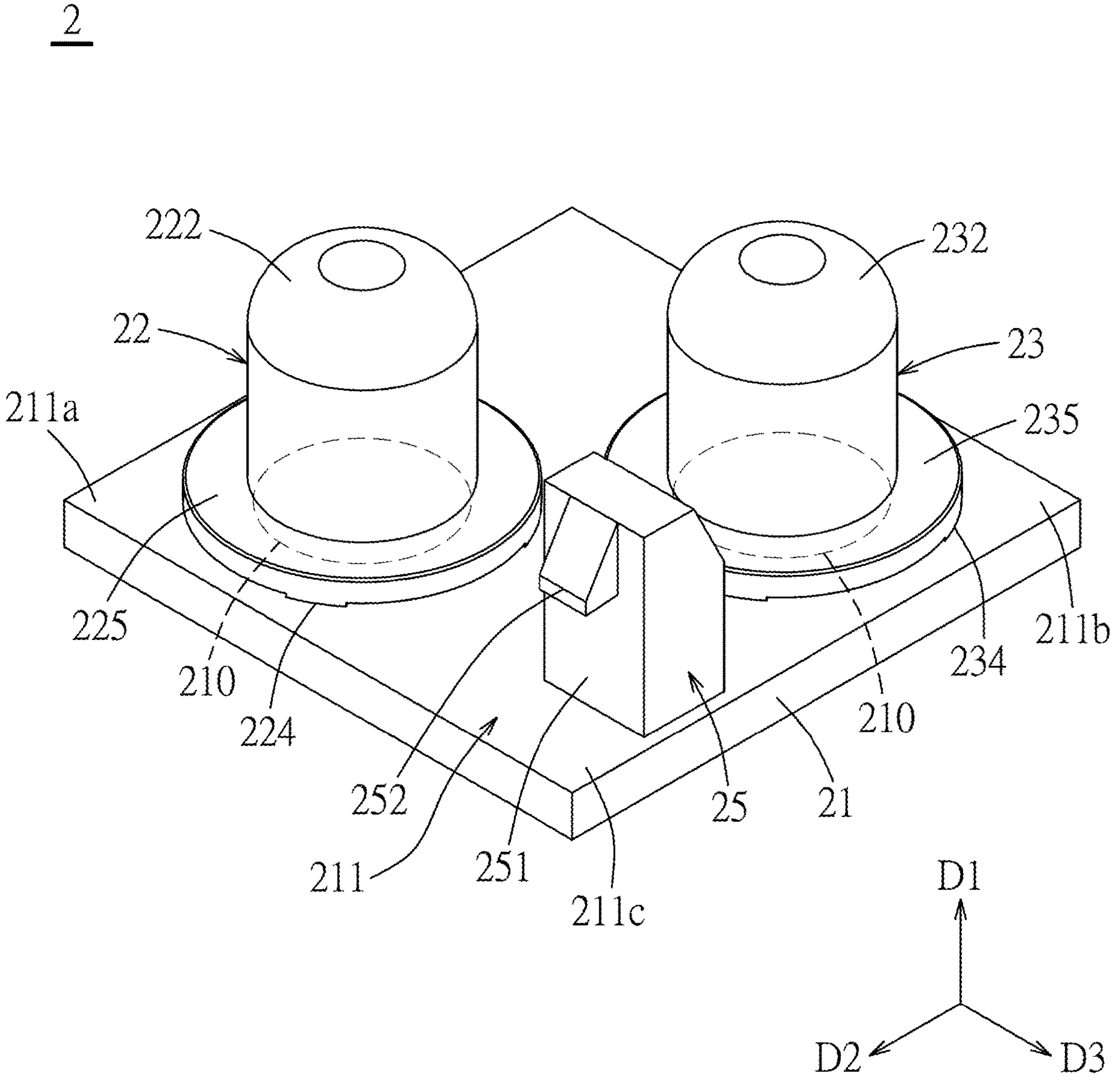
FIG. 12 is a perspective view of a board-end connector of a second embodiment of the present disclosure.

Referring to FIG. 12, a second embodiment of the assembly of the cable-end connector 1 and the board-end connector 2 of the present disclosure differs from the first embodiment in that, the base portion 251 of the second locking structure 25 is directly provided to the third corner 211*c* of the circuit board 21. The base portion 251 of the second locking structure 25 is provided to the circuit board 21 by means of, for example but not limited to, assembling. In the second embodiment, the seat body 24 and the interfering rib 223 of the third contact member 22 and the interfering rib 233 of the fourth contact member 23 which cooperate with the seat body 24 are eliminated, and the raising protrusion 224 and the raising protrusion 234 are formed on a bottom of the stopping portion 225 and a bottom of the stopping portion 235 respectively. In addition, it is noted that, in a varied manner of the second embodiment, the raising protrusion 224 and the raising protrusion 234 can be eliminated, at this time the stopping portion 225 and the stopping portion 235 are stopped to the top surface of the circuit board 21.

Figure 13:
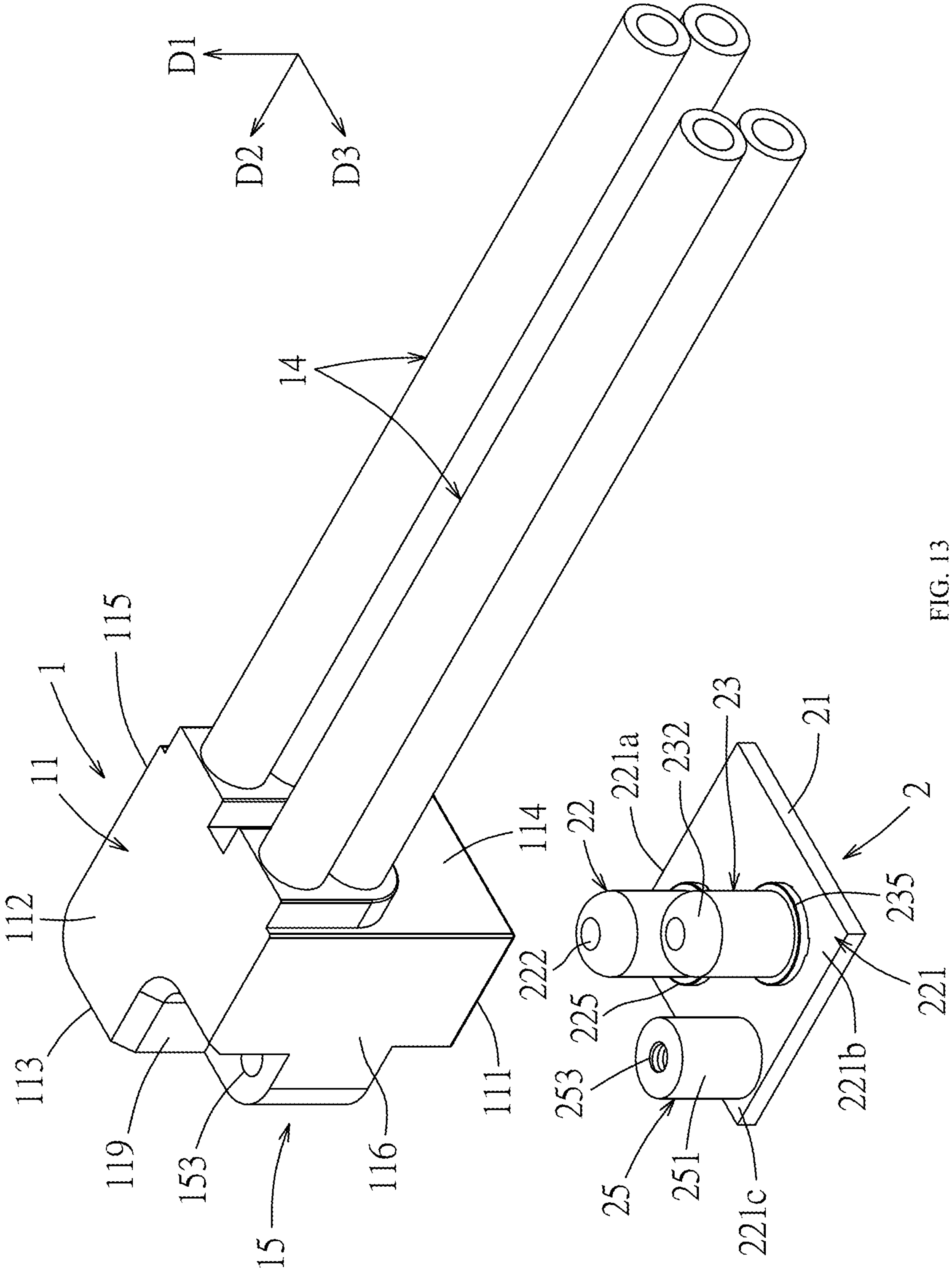
FIG. 13 is a perspective exploded view of a third embodiment of the present disclosure.
Figure 14:
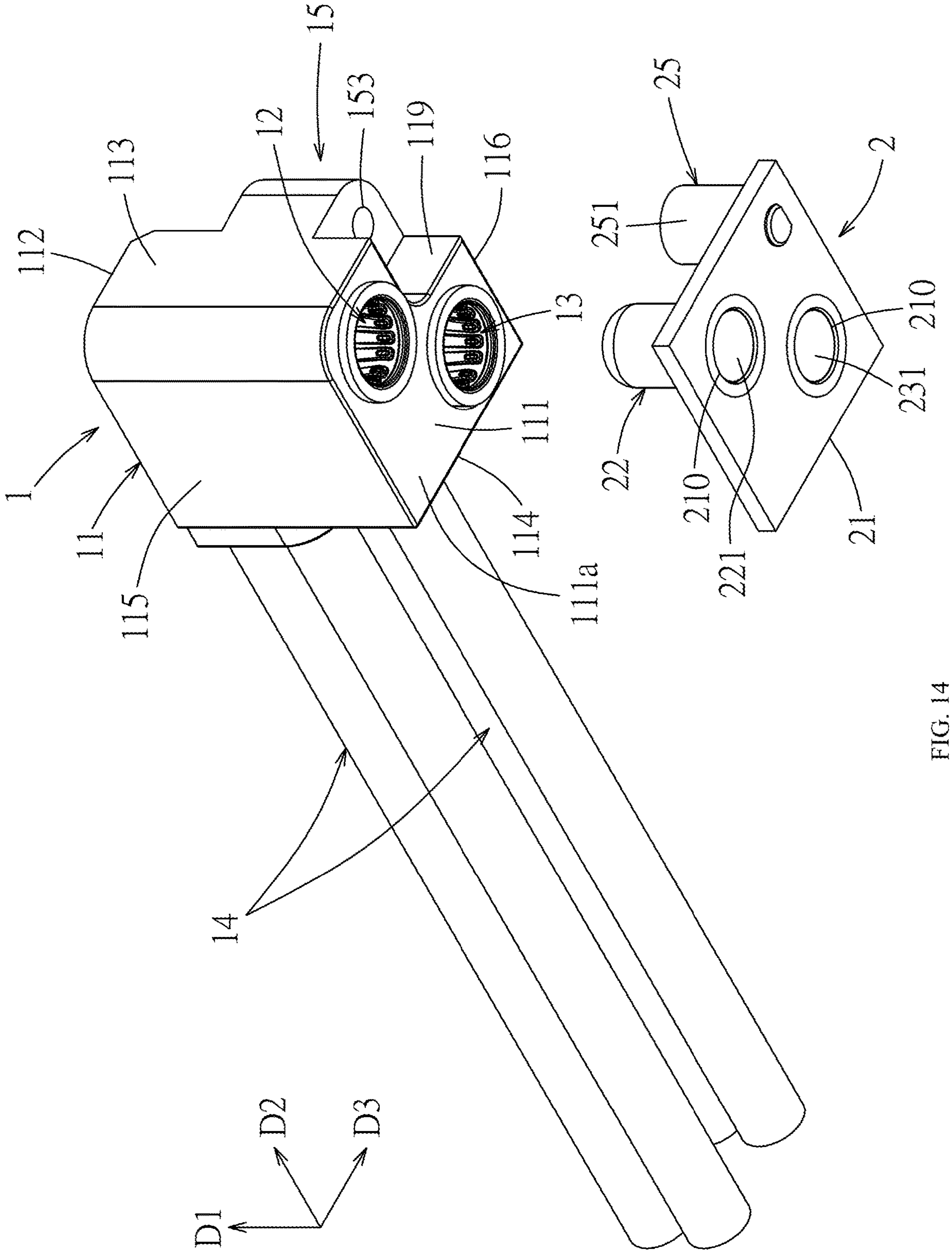
FIG. 14 is a perspective exploded view of the third embodiment of FIG. 13 viewed from another angle.

Referring to FIG. 13 and FIG. 14, a third embodiment of the assembly of the cable-end connector 1 and the board-end connector 2 of the present disclosure differs from the second embodiment in that, the outer casing 11 is integrally formed by over-molding. The second locking structure 25 includes the base portion 251 which inserts into the circuit board 21 and extends upwardly and a screw hole 253 which is provided to a top of the base portion 251, the first locking structure 15 has an opening 153 which penetrates in the up-down direction D1, the opening 153 and the screw hole 253 are used to allow a screw (not shown) to pass through the opening 153 and screw with the screw hole 253, so as to make the first locking structure 15 and the second locking structure 25 locked with each other.

Figure 15:
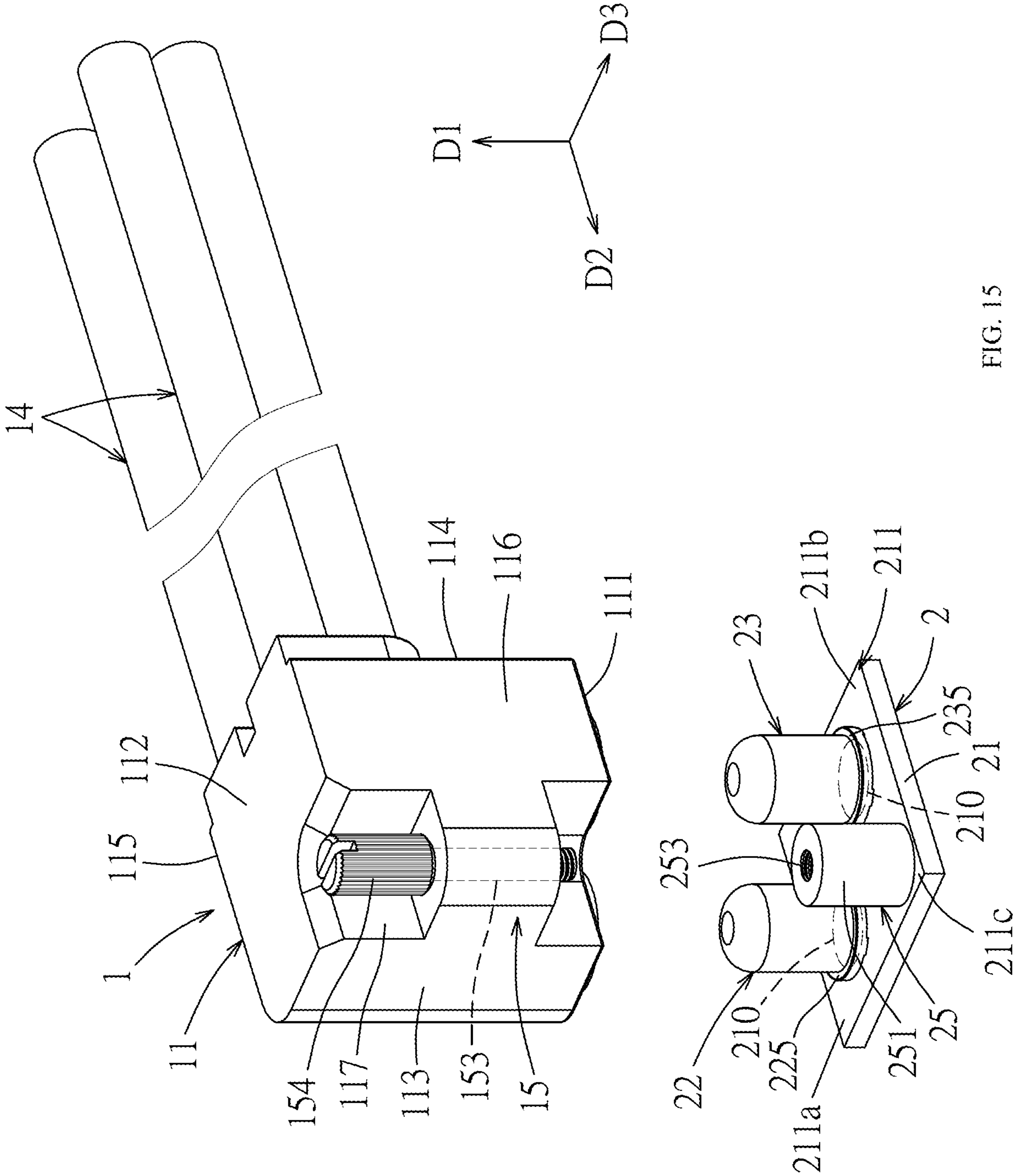
FIG. 15 is a perspective exploded view of a fourth embodiment of the present disclosure.

Referring to FIG. 15, a fourth embodiment of the assembly of the cable-end connector 1 and the board-end connector 2 of the present disclosure differs from the third embodiment in that, the first locking structure 15 further has a screw 154 which rotatively passes through the opening 153 and is used to screw with the screw hole 253, thereby avoiding loss of the screw 154 and increasing convenience of the locking.

Figure 16:
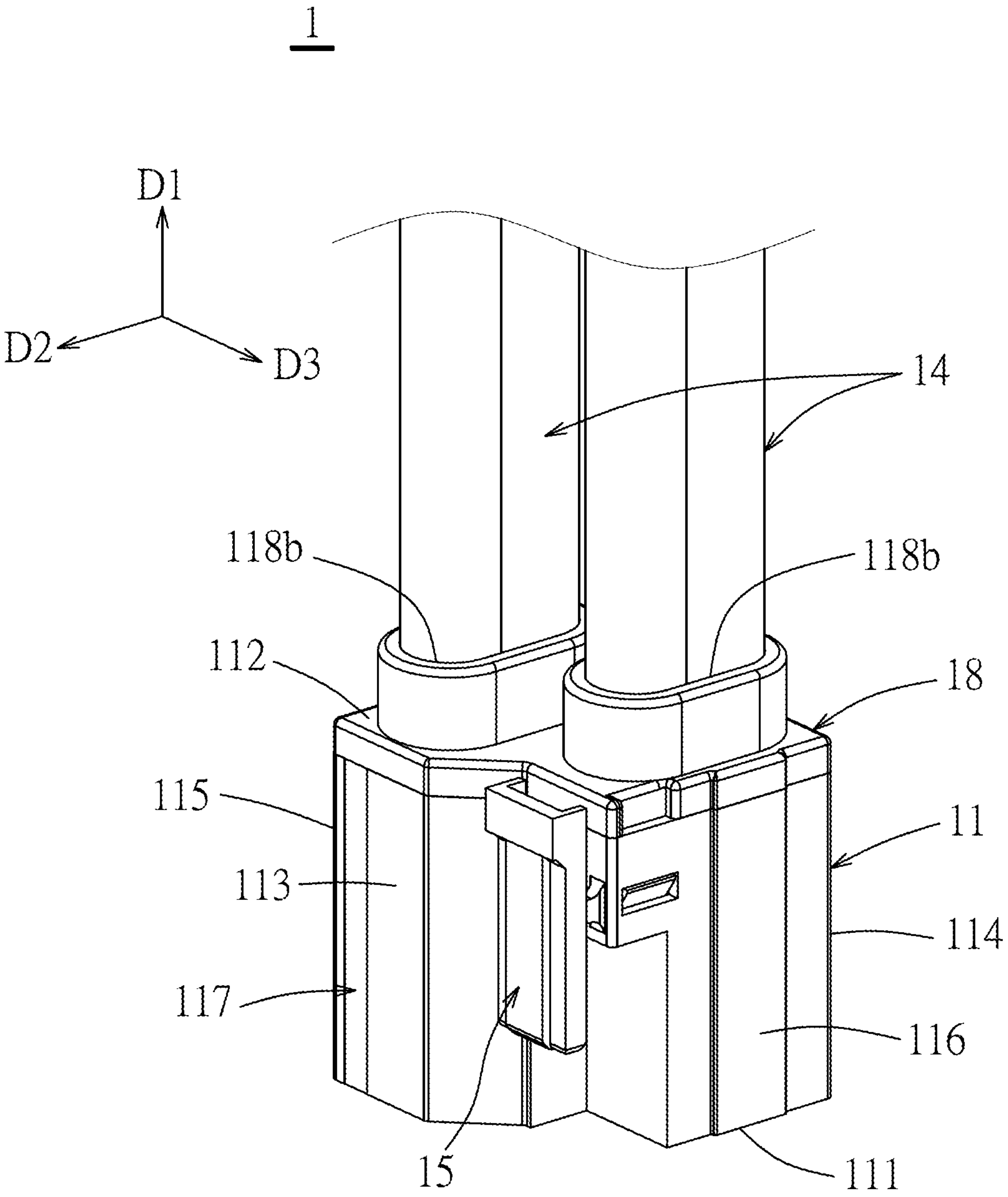
FIG. 16 is a perspective view of a cable-end connector of a fifth embodiment of the present disclosure.
Figure 17:
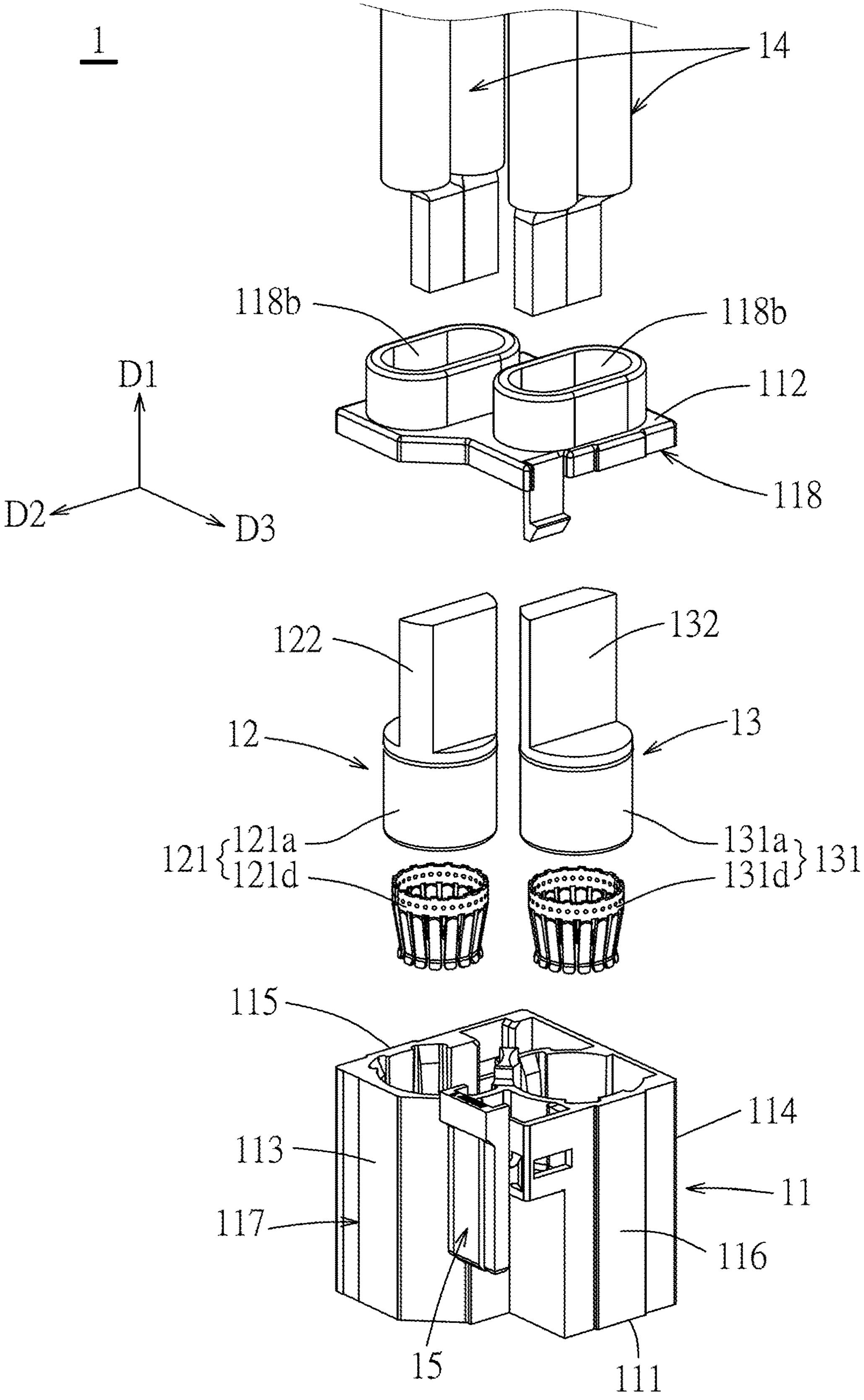
FIG. 17 is a perspective exploded view of the cable-end connector of the fifth embodiment.

Referring to FIG. 16 and FIG. 17, a fifth embodiment of the assembly of cable-end connector 1 and the board-end connector 2 of the present disclosure differs from the first embodiment in that, the two cables 14 respectively enter into the two through grooves 117*b* of the outer casing 11 via the two cable passing holes 118*b* of the cover 118 of the outer casing 11 which are provided to the upper end face 112 so that the two cables 14 are electrically connected with the first connecting portion 122 and the second connecting portion 132 respectively.

Figure 18:
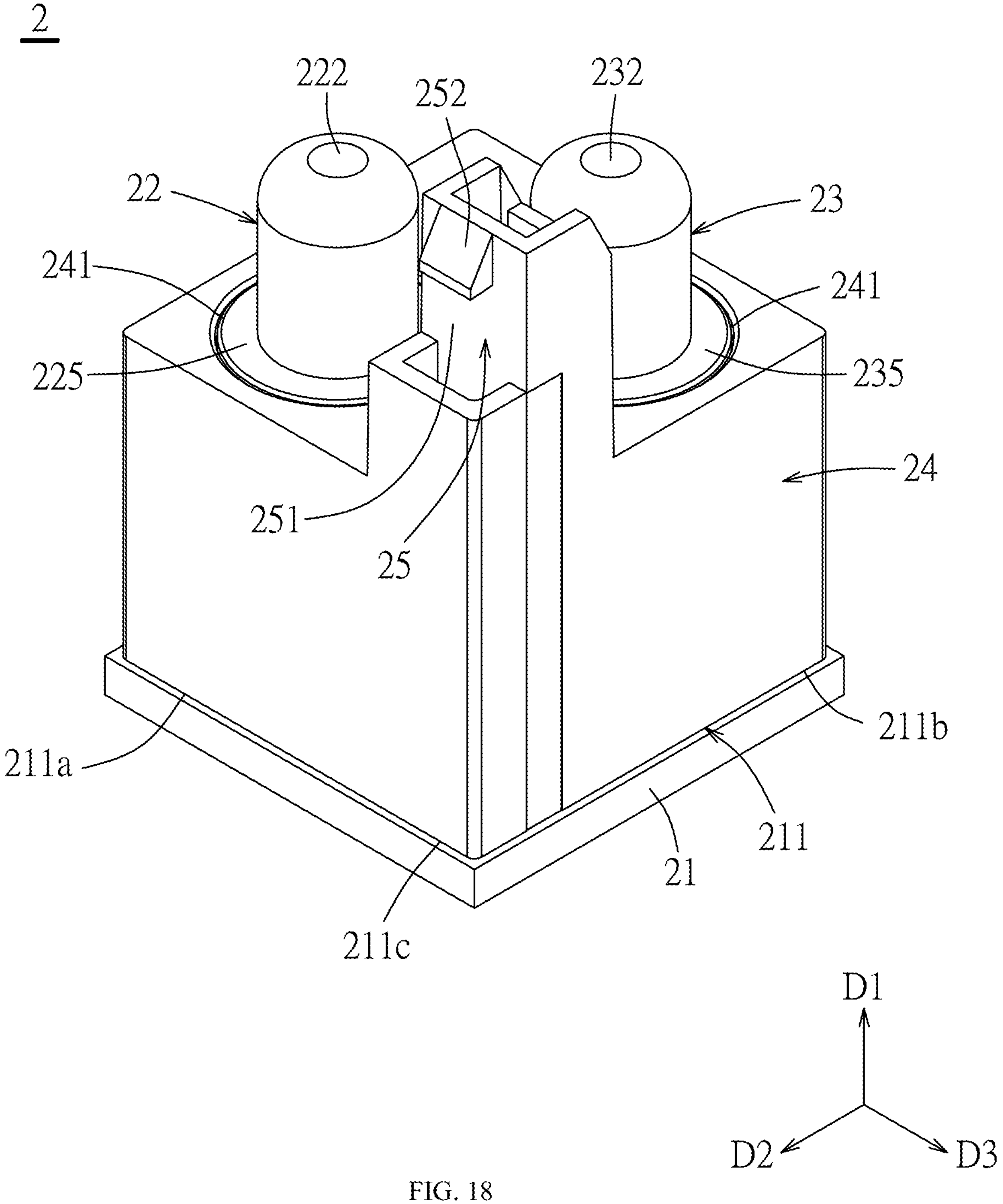
FIG. 18 is a perspective view of a board-end connector of a sixth embodiment of the present disclosure.
Figure 19:
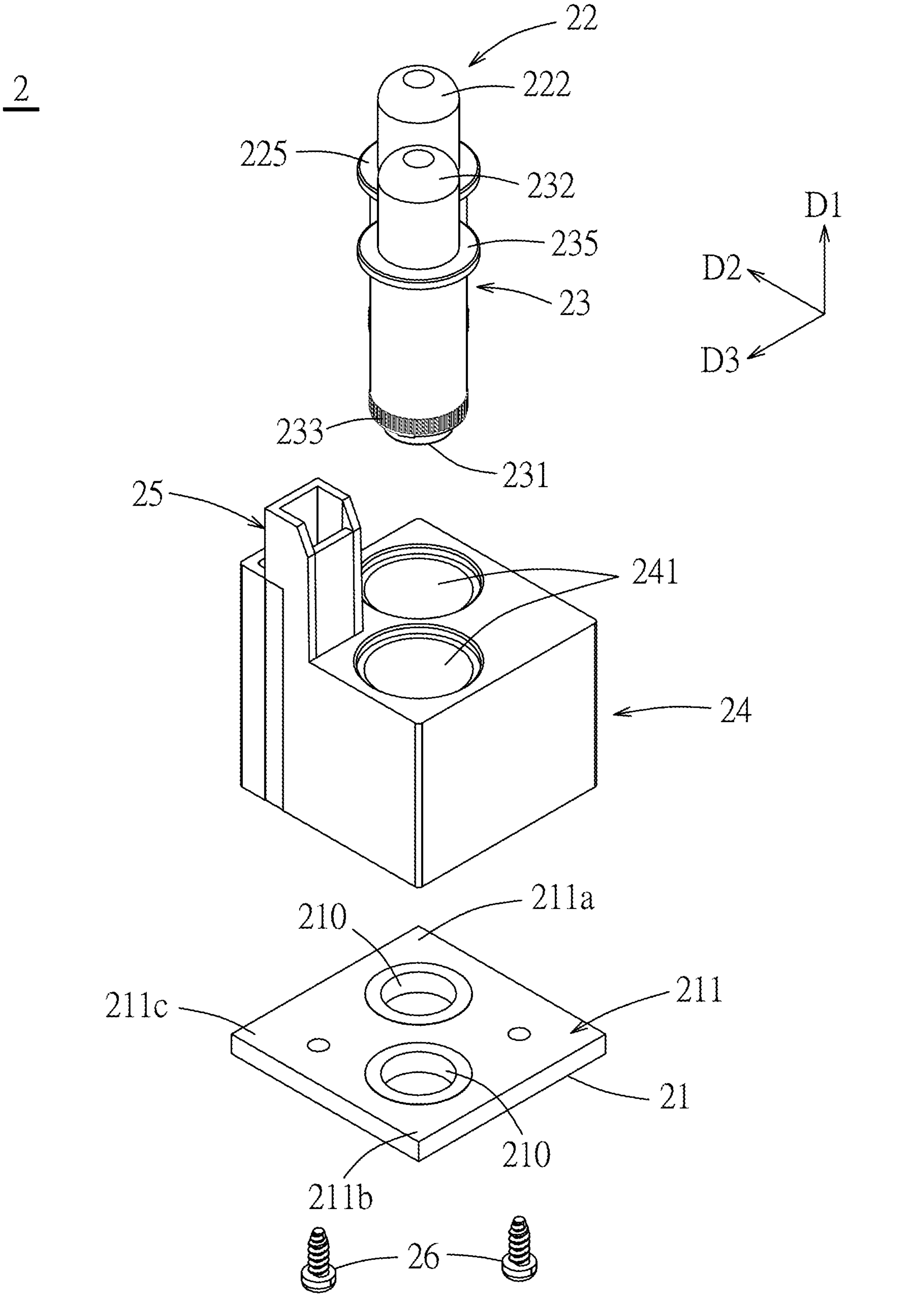
FIG. 19 is a perspective exploded view of the board-end connector of the sixth embodiment.
Figure 20:
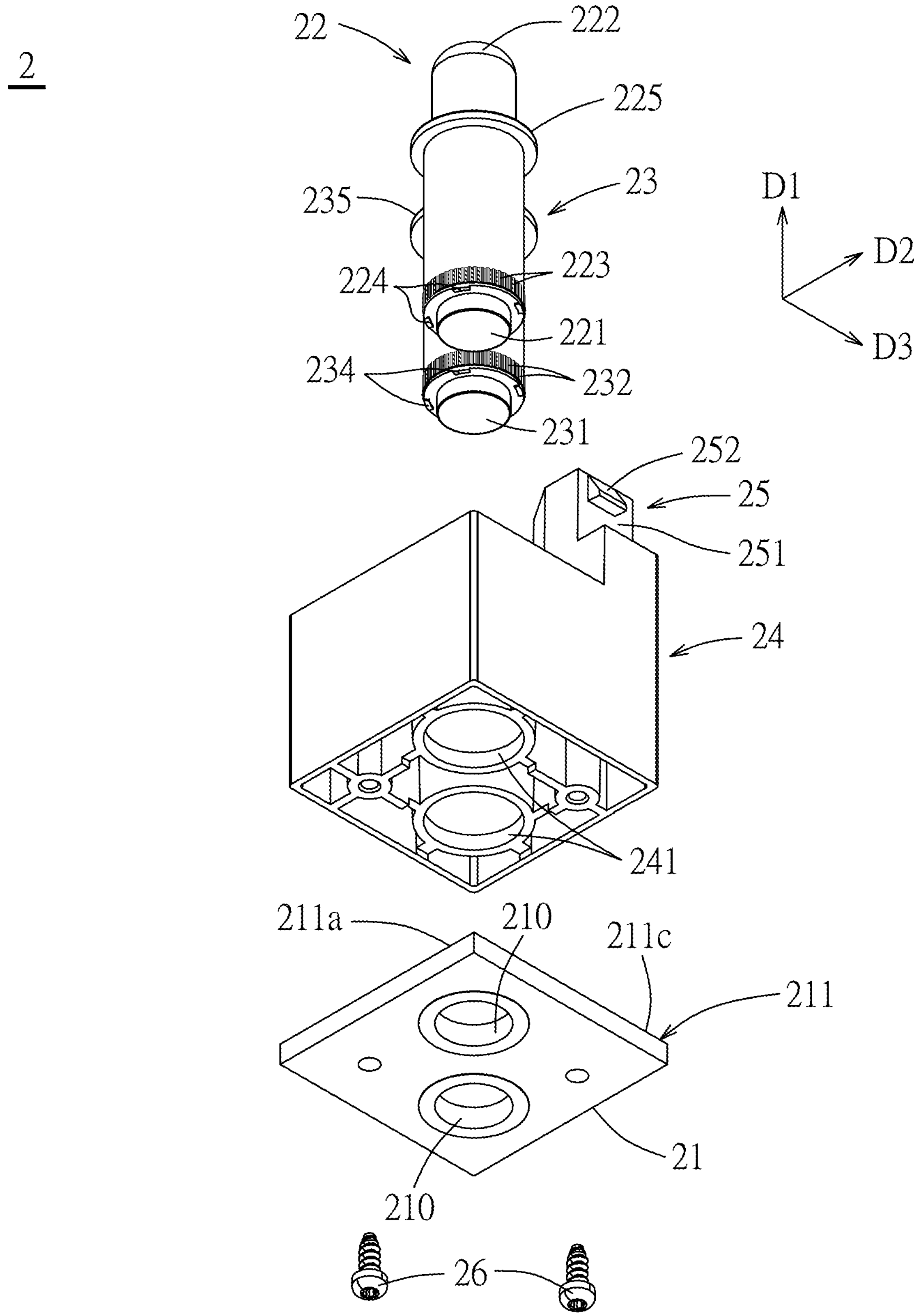
FIG. 20 is a perspective exploded view of the sixth embodiment of FIG. 19 viewed from another angle.
Figure 21:
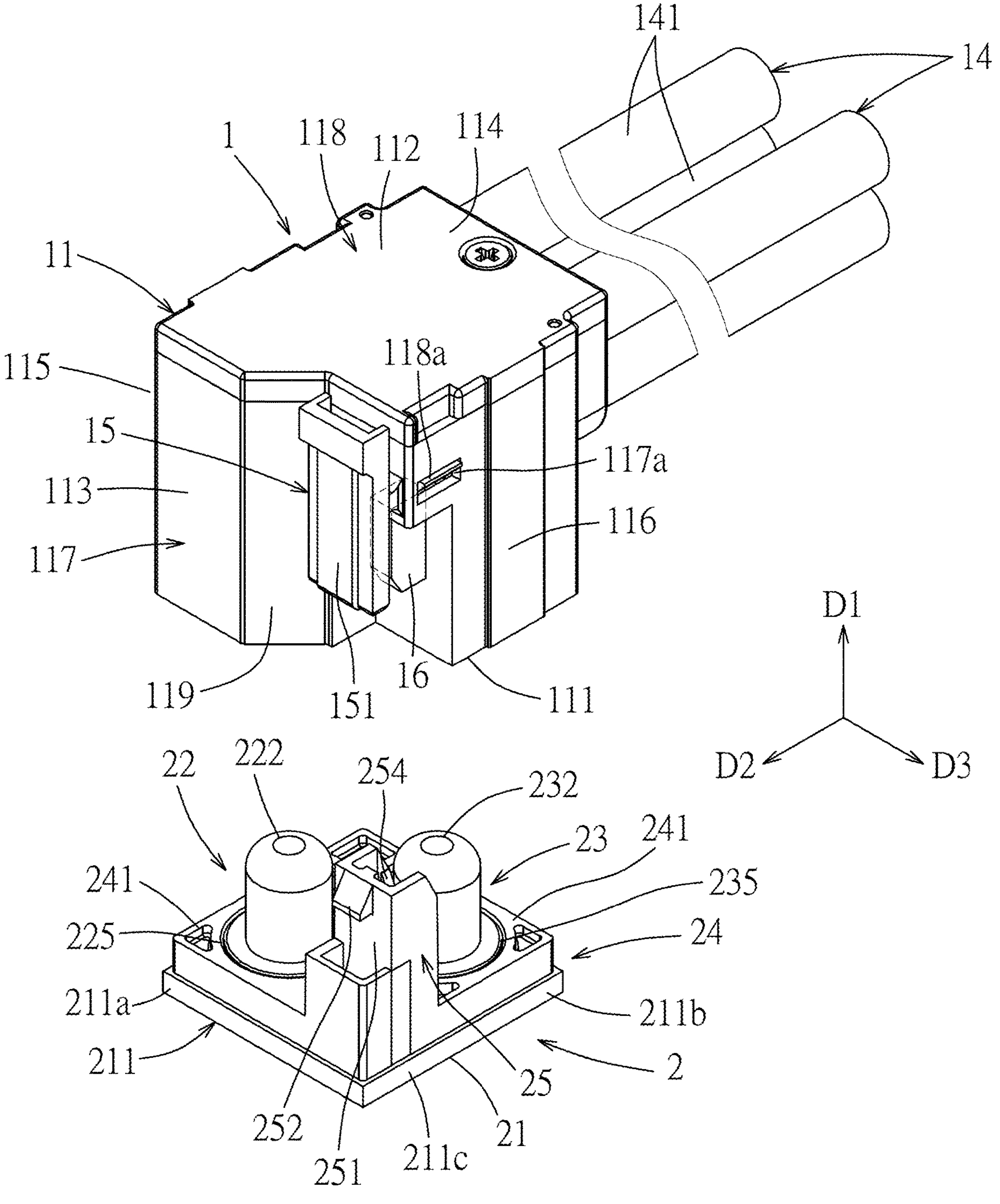
FIG. 21 is a perspective exploded view of a seventh embodiment of the present disclosure.
Figure 22:
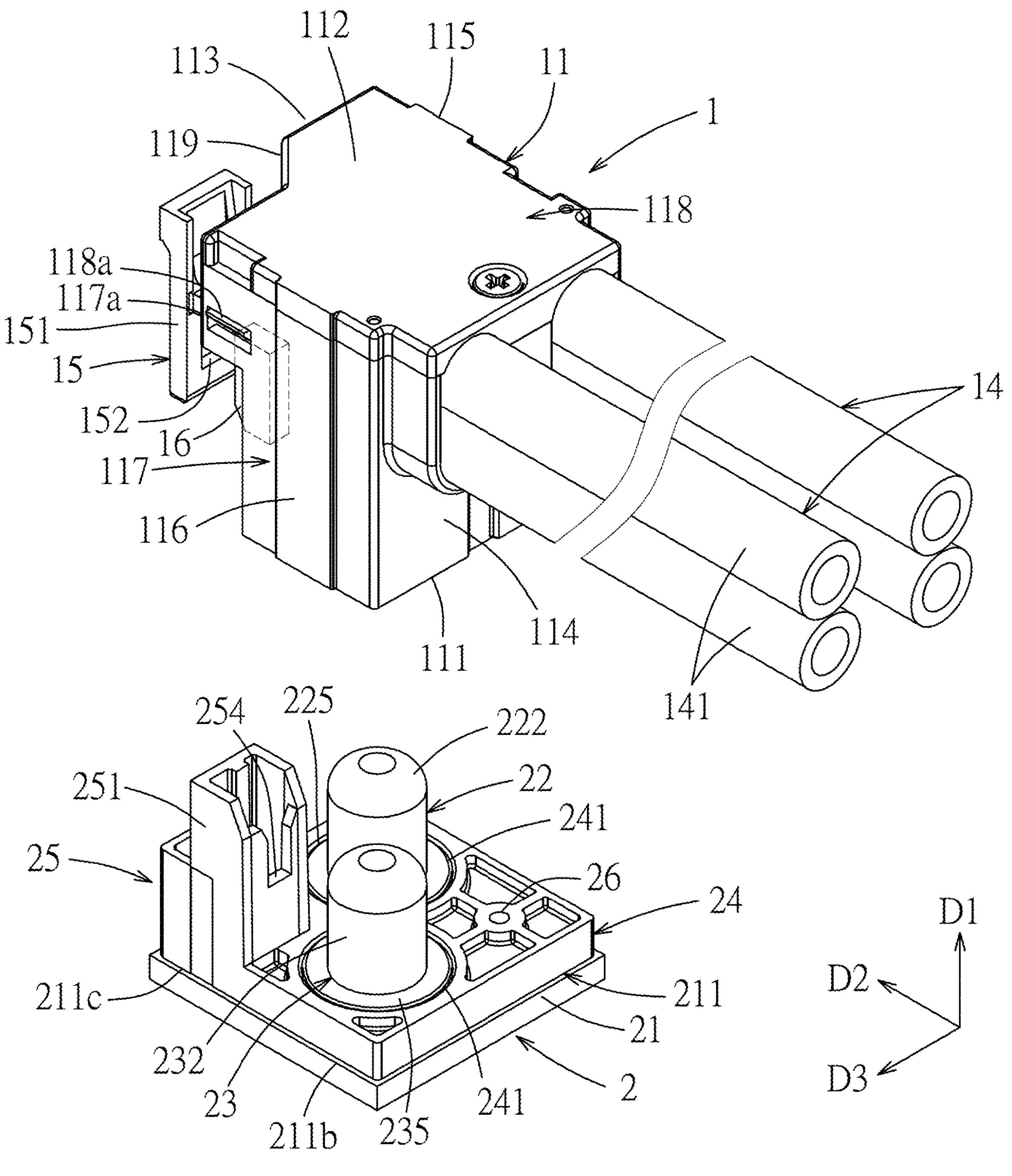
FIG. 22 is a perspective exploded view of the seventh embodiment of FIG. 21 viewed from another angle.
Figure 23:
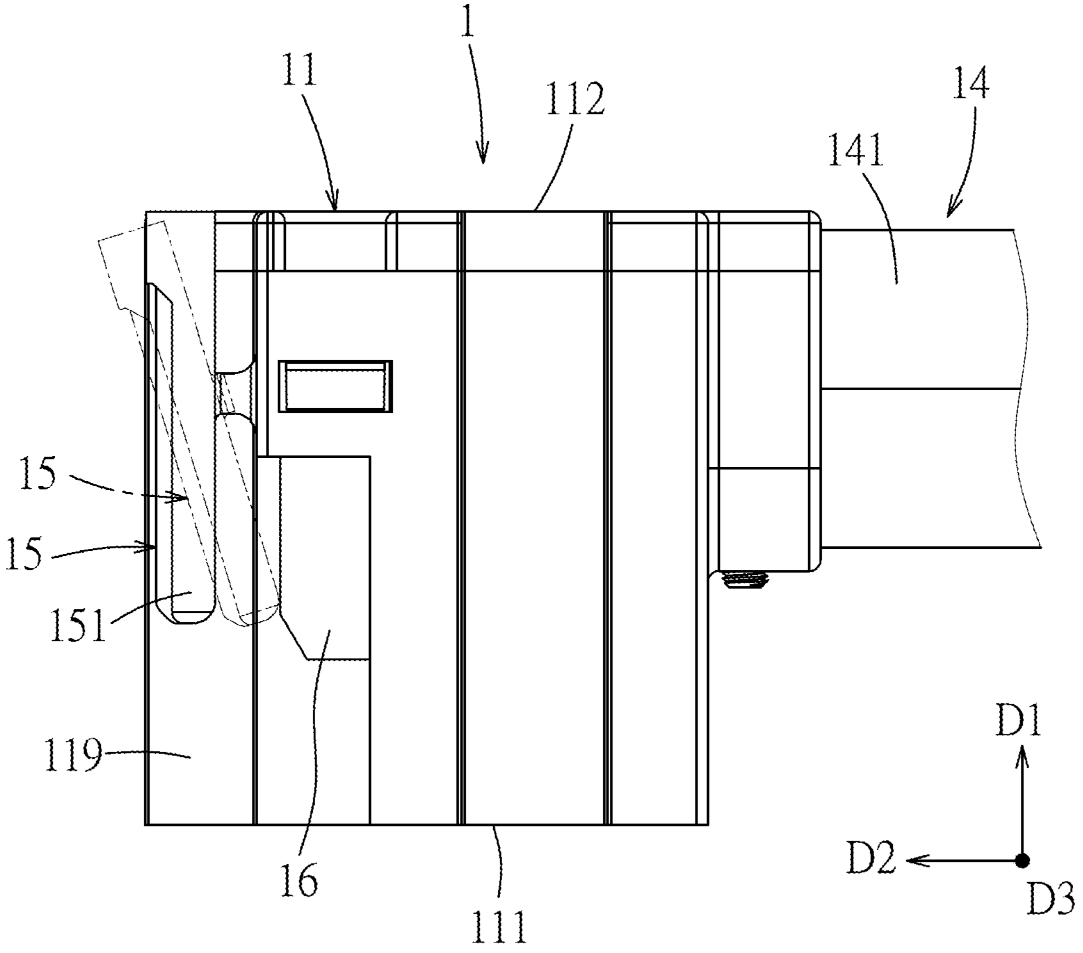
FIG. 23 is a side view of a cable-end connector of the seventh embodiment.
Figure 24:
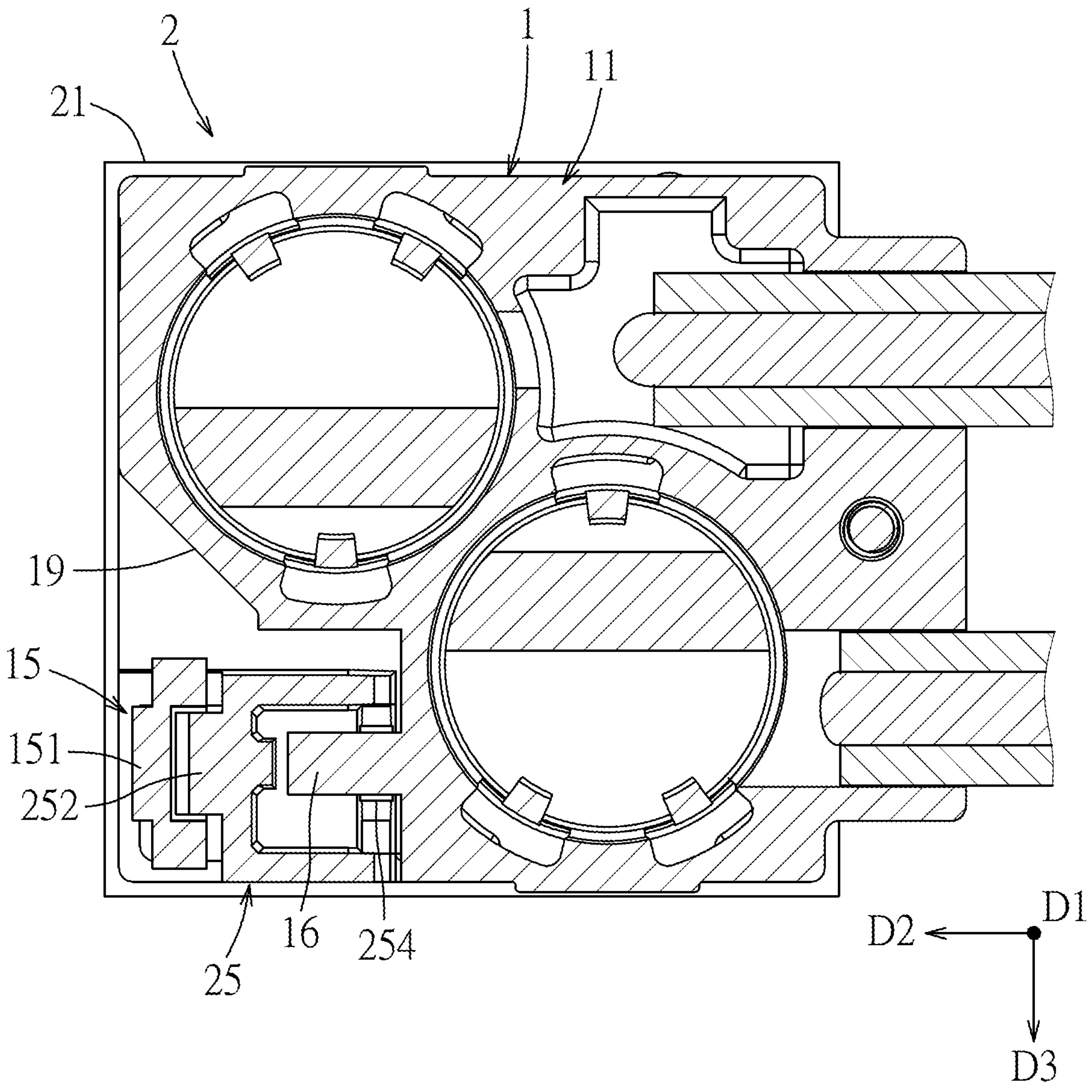
FIG. 24 is a cross-sectional view of the seventh embodiment in which a cable-end connector and a board-end connector of the seventh embodiment are mated with each other.

Referring to FIG. 18 to FIG. 20, a sixth embodiment of the assembly of the cable-end connector 1 and the board-end connector 2 of the present disclosure differs from the first embodiment in that, the seat body 24 and the through-holes 241 thereof, the third contact member 22 and the fourth contact member 23 are higher in height along the up-down direction D1.

Referring to FIG. 21 to FIG. 24, a seventh embodiment of the assembly of the cable-end connector 1 and the board-end connector 2 of the present disclosure differs from the first embodiment in that, the cable-end connector 1 further has an abutting rib 16 which is provided in the recessed portion 119 of the outer casing 11 and is positioned behind the cantilevered arm 151 of the first locking structure 15, the abutting rib 16 is capable of allowing a lower segment of the cantilevered arm 151 of the first locking structure 15 to abut thereagainst when the lower segment of the cantilevered arm 151 of the first locking structure 15 is displaced rearwardly (see FIG. 23) so as to avoid excessive deformation of the first locking structure 15 and damage to the first locking structure 15. The second locking structure 25 of the board-end connector 2 further includes an avoiding groove 254 which is formed to the base portion 251 and corresponds to the abutting rib 16, the avoiding groove 254 is used to avoid the abutting rib 16 when the first locking structure 15 and the second locking structure 25 are locked with each other.

In conclusion, in the present disclosure, by that the first contact member 12 and the second contact member 13 are arranged diagonally and the third contact member 22 and the fourth contact member 23 are arranged diagonally, the cable-end connector 1 and the board-end connector 2 can be reduced in width along a lateral direction, and designed spaces respectively for the first locking structure 15 and the second locking structure 25 can be reserved, in turn a space of the cable-end connector 1 and a space of the board-end connector 2 can be used effectively, meanwhile, the first locking structure 15 and the second locking structure 25 can be designed larger in dimension so as to increase structural strengths thereof.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. A cable-end connector comprising:

an outer casing having a mating face which is positioned at a bottom of the outer casing, a front end face and a rear end face which face each other, and a first side face and a second side face which face each other, the front end face, the rear end face, the first side face and the second side face being formed by extending from respective side edges of the mating face, the outer casing having a recessed portion which is positioned adjacent to the front end face or the rear end face;

a first contact member provided in the outer casing, the first contact member comprising a first mating portion which is provided in the outer casing and extends toward the mating face and a first connecting portion which is connected to the first mating portion;

a second contact member provided in the outer casing, the second contact member comprising a second mating portion which is provided in the outer casing and extends toward the mating face and a second connecting portion which is connected to the second mating portion;

two cables entering into the outer casing and electrically connected with the first connecting portion and the second connecting portion respectively;

a first locking structure provided to the outer casing, the first locking structure being at least partially positioned in the recessed portion so that the first locking structure, the first contact member and the second contact member are triangularly arranged; and a plane portion positioned in the mating face and away from the recessed portion, the plane portion being adjacent to the first mating portion of the first contact member and being adjacent to the second mating portion of the second contact member, the plane portion, the first contact member and the second contact member being triangularly arranged.

2. The cable-end connector of claim 1, wherein the recessed portion is adjacent to a corner which is between the front end face and the second side face, the first contact member is adjacent to a corner which is between the front end face and the first side face, the second contact member is adjacent to a corner which is between the rear end face and the second side face, and the plane portion is adjacent to a corner which is between the rear end face and the first side face.

3. The cable-end connector of claim 1, wherein the outer casing is formed by over-molding.

4. The cable-end connector of claim 1, wherein the outer casing comprises a housing and a cover which are assembled with each other.

5. The cable-end connector of claim 4, wherein the housing has two through grooves which accommodate the first contact member and the second contact member respectively, each through groove is provided with a stopping edge which is positioned at a bottom of the housing and is adjacent to the mating face and an elastic stopping arm which extends from a top of the housing into the through groove, the stopping edges of the two through grooves are used to stop a bottom edge of the first contact member and a bottom edge of the second contact member respectively, and the elastic stopping arms of the two through grooves are used to stop an upper stopping surface of the first contact member and an upper stopping surface of the second contact member respectively.

6. The cable-end connector of claim 1, wherein the first mating portion comprises a barrel body and a cage-shaped contact body provided inside the barrel body, and the second mating portion comprises a barrel body and a cage-shaped contact body provided inside the barrel body.

7. The cable-end connector of claim 6, wherein the cage-shaped contact body of the first mating portion and second connecting portion each have an annular head portion and an elastic contact piece which is formed to extend from the annular head portion.

8. The cable-end connector of claim 1, wherein the first locking structure has a cantilevered arm which extends downwardly and a first latching unit which is provided to the cantilevered arm.

9. The cable-end connector of claim 1, wherein the first locking structure has an opening which penetrates in an up-down direction.

10. The cable-end connector of claim 1, wherein the first locking structure comprises an opening which penetrates in an up-down direction and a screw which rotatively passes through the opening.

11. The cable-end connector of claim 1, wherein a projection of the first contact member onto the front end face and a projection of the second contact member onto the front end face are partially overlapped with each other.

12. The cable-end connector of claim 1, wherein a projection of the first contact member onto the first side face and a projection of the second contact member onto the first side face are partially overlapped with each other.

13. The cable-end connector of claim 1, wherein the two cables enter into the outer casing from the rear end face and are electrically connected with the first connecting portion and the second connecting portion respectively.

14. The cable-end connector of claim 1, wherein the outer casing further has an upper end face which is spaced apart from the mating face and faces the mating face, and the two cables respectively enter into the outer casing from the upper end face and are electrically connected with the first connecting portion and the second connecting portion respectively.

15. A board-end connector comprising:

a circuit board having a rectangular region, a first corner and a second corner which are positioned diagonally within the rectangular region and face each other, and a third corner which is positioned within the rectangular region;

a third contact member provided to the first corner and comprising a third connecting portion which is electrically connected to the circuit board and a third mating portion which is formed by extending upwardly from the third connecting portion;

a fourth contact member provided to the second corner and diagonally arranged with the third contact member, and comprising a fourth connecting portion which is electrically connected to the circuit board and a fourth mating portion formed by extending upwardly from the fourth connecting portion; and a second locking structure provided to the third corner.

16. The board-end connector of claim 15, wherein the second locking structure comprises a base portion which extends upwardly and a second latching unit which is provided to the base portion.

17. The board-end connector of claim 15, wherein the second locking structure comprises a base portion which extends upwardly and a screw hole which is provided to the base portion.

18. The board-end connector of claim 15, wherein the board-end connector further comprises a seat body which is rectangular in shape and provided to the circuit board, the seat body has two through-holes which penetrate in an up-down direction and are formed at positions respectively corresponding to the first corner and the second corner of the circuit board, the third mating portion and the fourth mating portion pass upwardly through the two through-holes respectively, the second locking structure is formed to be constructed integrally from the seat body, and the seat body and the circuit board are locked with each other by at least one screw.

19. The board-end connector of claim 15, wherein the third mating portion and the fourth mating portion are cylindrical in shape.

20. An assembly of a cable-end connector and a board-end connector, comprising:

a cable-end connector comprising an outer casing having a mating face which is positioned at a bottom of the outer casing, a front end face and a rear end face which face each other, and a first side face and a second side face which face each other, the front end face, the rear end face, the first side face and the second side face being formed by extending from respective side edges of the mating face, the outer casing having a recessed portion which is positioned adjacent to the front end face or the rear end face;

a first contact member provided in the outer casing, the first contact member comprising a first mating portion which is provided in the outer casing and extends toward the mating face and a first connecting portion which is connected to the first mating portion;

a second contact member provided in the outer casing, the second contact member comprising a second mating portion which is provided in the outer casing and extends toward the mating face and a second connecting portion which is connected to the second mating portion;

two cables entering into the outer casing and electrically connected with the first connecting portion and the second connecting portion respectively;

a first locking structure provided to the outer casing, the first locking structure being at least partially positioned in the recessed portion so that the first locking structure, the first contact member and the second contact member are triangularly arranged; and a plane portion positioned in the mating face and away from the recessed portion, the plane portion being adjacent to the first mating portion of the first contact member and being adjacent to the second mating portion of the second contact member, the plane portion, the first contact member and the second contact member being triangularly arranged;

a board-end connector used to mate with the cable-end connector, and the board-end connector comprising:

a circuit board;

a third contact member comprising a third connecting portion which is electrically connected to the circuit board and a third mating portion which is formed by extending upwardly from the third connecting portion and is used to mate with the first mating portion;

a fourth contact member comprising a fourth connecting portion which is electrically connected to the circuit board and a fourth mating portion which is formed by extending upwardly from the fourth connecting portion and is used to mate with the second mating portion; and a second locking structure provided to the circuit board, the second locking structure being used to lock with the first locking structure.

* * * * *